INVENTOR.
FRANK C. LORNITZO

Amster & Rothstein
ATTORNEYS

May 26, 1970  F. C. LORNITZO  3,514,020
COLLAR CLAMP FOR SHIRT-FOLDING MACHINE
Original Filed July 13, 1964  15 Sheets-Sheet 2

INVENTOR.
FRANK C. LORNITZO
Amster & Rothstein
ATTORNEYS

INVENTOR.
FRANK C. LORNITZO
Amster & Rothstein
ATTORNEYS

INVENTOR.
FRANK C. LORNITZO

INVENTOR.
FRANK C. LORNITZO
Amster & Rothstein
ATTORNEYS

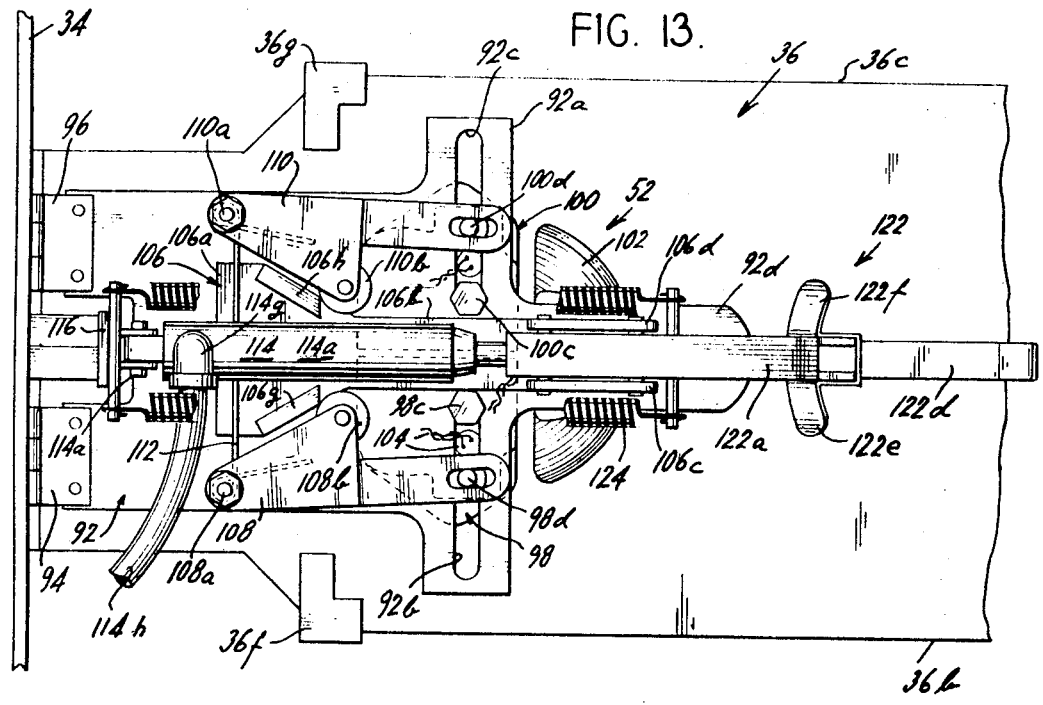

INVENTOR.
FRANK C. LORNITZO

ATTORNEYS

May 26, 1970   F. C. LORNITZO   3,514,020
COLLAR CLAMP FOR SHIRT-FOLDING MACHINE
Original Filed July 13, 1964   15 Sheets-Sheet 12
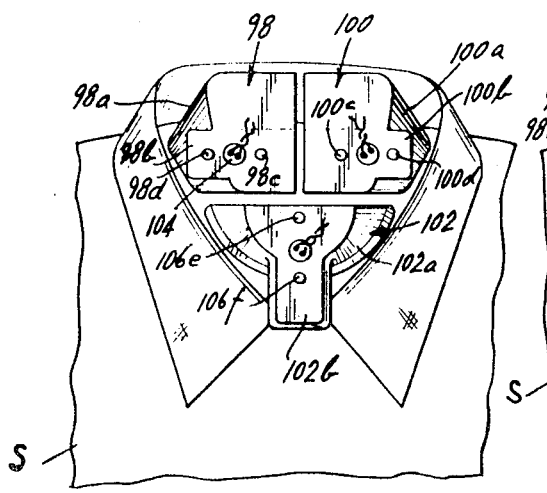
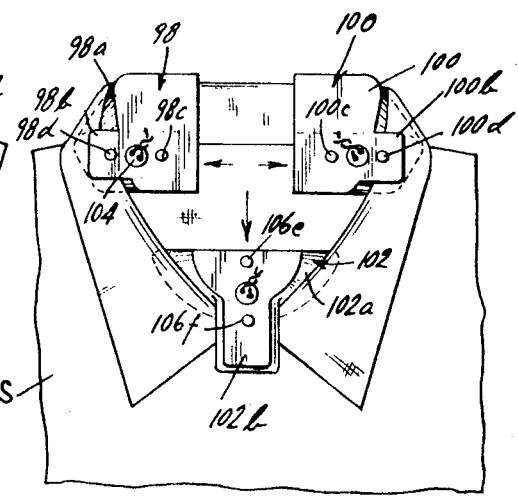
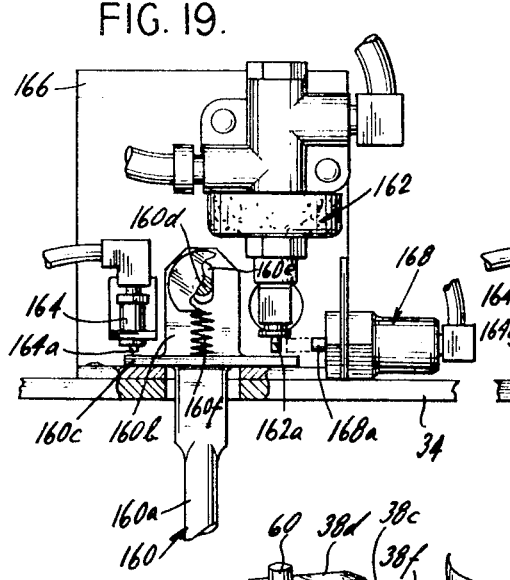
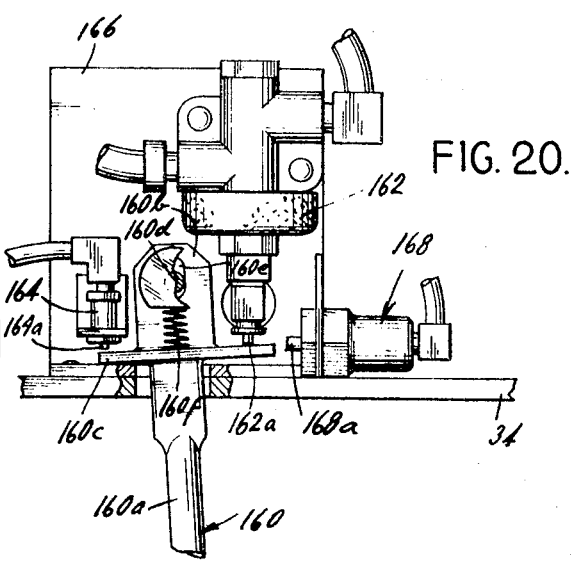
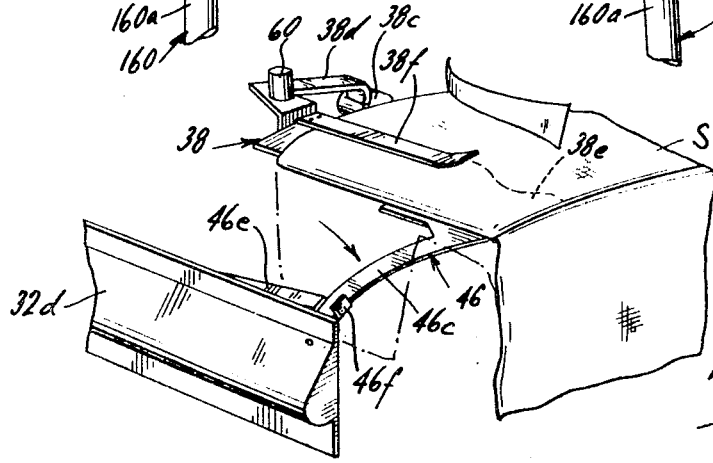
INVENTOR.
FRANK C. LORNITZO
Amster & Rothstein
ATTORNEYS

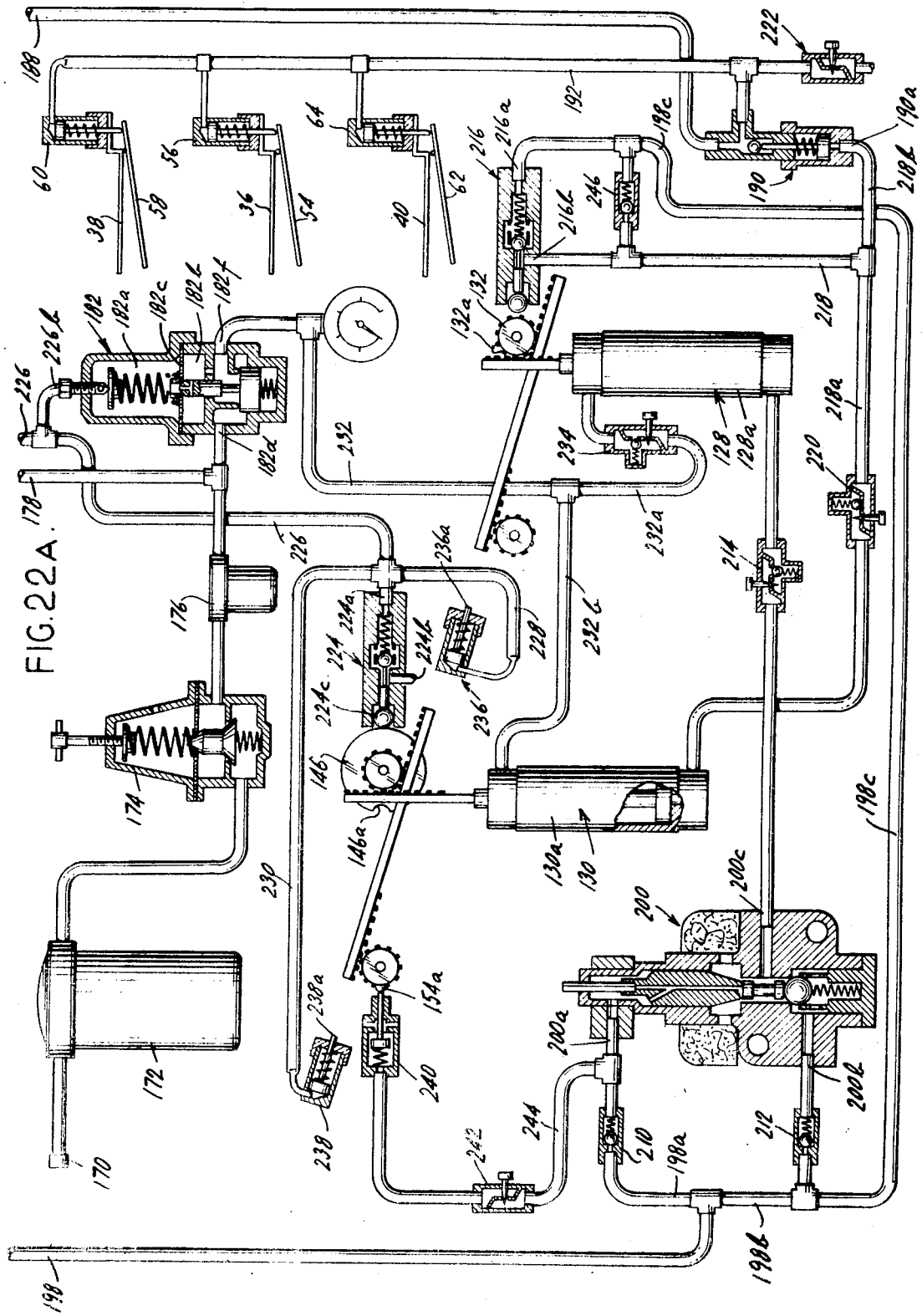

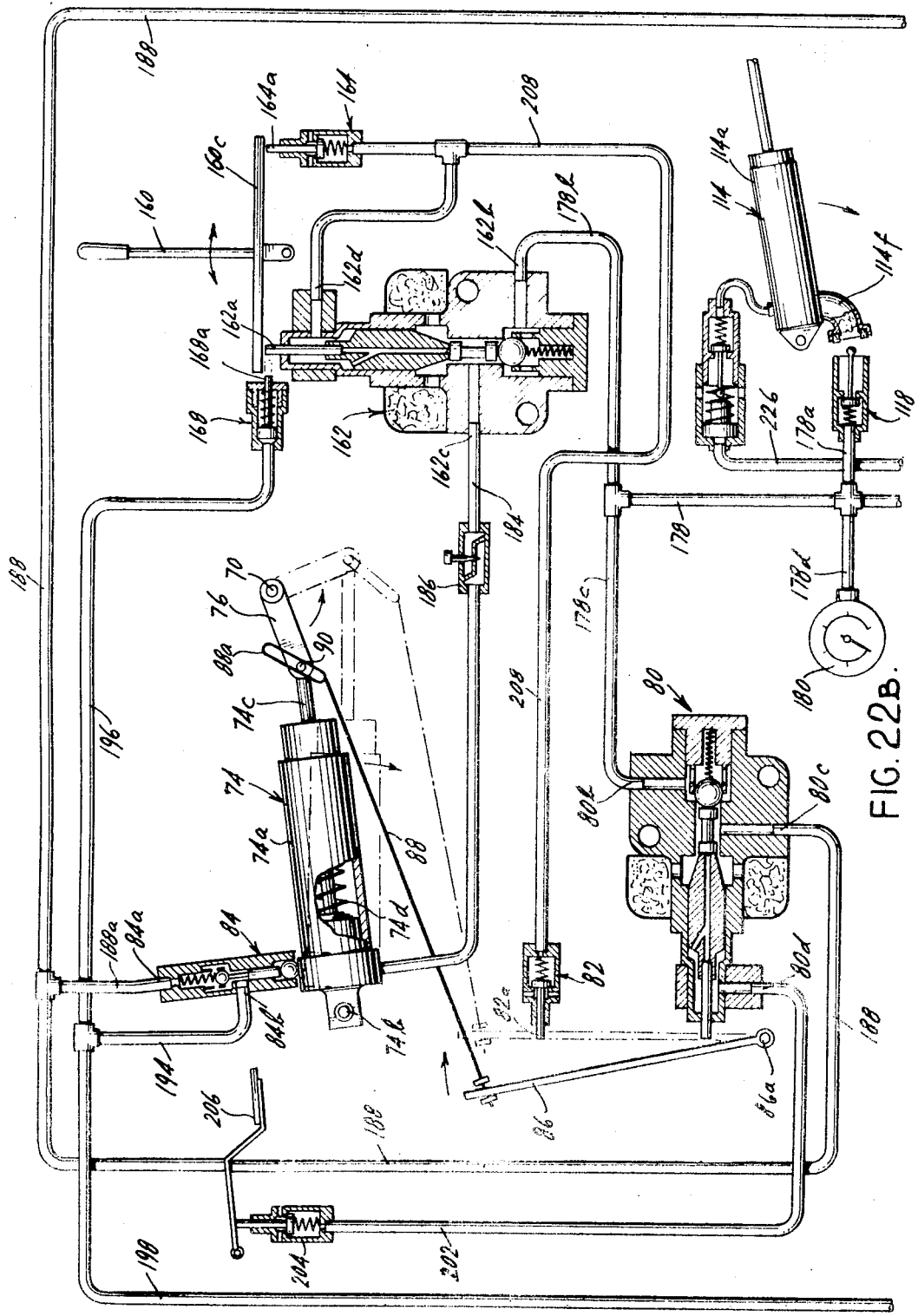

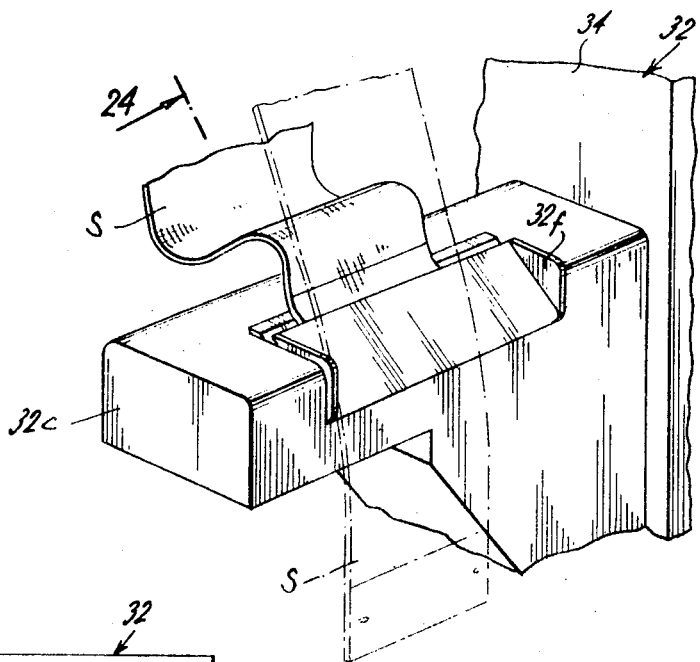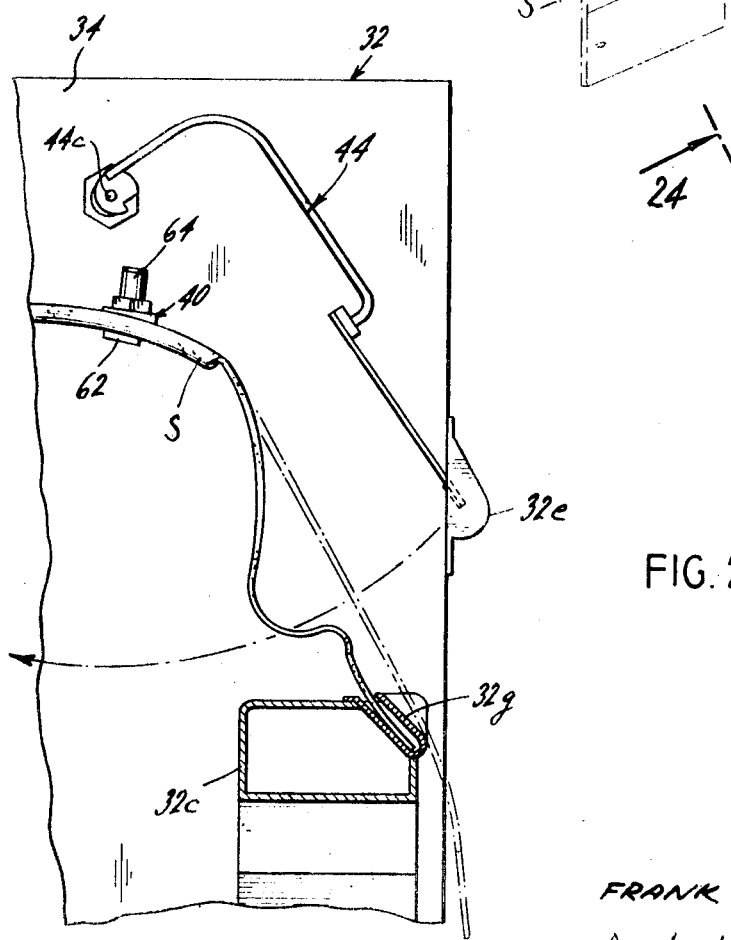

United States Patent Office 3,514,020
Patented May 26, 1970

3,514,020
COLLAR CLAMP FOR SHIRT-FOLDING MACHINE
Frank C. Lornitzo, Pawtucket, R.I., assignor to Ametek, Inc., New York, N.Y., a corporation of Delaware
Original application July 13, 1964, Ser. No. 382,007, now Patent No. 3,419,199, dated Dec. 31, 1968. Divided and this application Sept. 10, 1968, Ser. No. 810,046
Int. Cl. D06c 15/00
U.S. Cl. 223—52.1
5 Claims

ABSTRACT OF THE DISCLOSURE

A shirt-folding machine including a frame and a clamp for shaping and clamping the collar of a shirt. The clamp includes a clamp carrier which is mounted on the frame and which moves in and out of a clamping position. The carrier has a pair of collar jaws which move from a retracted position, in which position they are inserted into the collar, to an expanded position in which position they engage the collar neckband. Actuating means are provided for moving the clamping jaws to their expanded position when the clamp moves to its collar clamping position.

---

This is a division of application Ser. No. 382,007, filed on July 13, 1964, now Pat. No. 3,419,199.

The present invention relates generally to garment-handling apparatus and methods, and in particular to a machine for folding shirts of the type including a collar, a shirt body and sleeves and to an improved method for folding such shirts.

Numerous machines and methods have been available for the manual, semi-automatic or fully automatic folding of shirts after laundering. However, such machines have not been found to meet the practical day to day requirements imposed under actual operating conditions in commercial laundry and cleaning establishments. Optimally, a shirt-folding machine should be able to handle, without the need for adjustment, shirts ranging from size 14 to size 18, materials ranging from lightweight dress shirt fabrics to heavyweight work shirt fabrics, and styles ranging from conventional dress shirts to sport shirts, to heavy work shirts and to formal dress shirts. The situation is somewhat more complicated in that the intermix of shirt sizes and styles also involves an intermix of sleeve lengths and sleeve types, including short sleeves, conventional barrel cuff sleeves, and French cuffs. Folding of the aforesaid random intermixture of shirt sizes, styles and types must be accomplished under conditions wherein the resulting package is neat and attractive and is relatively compact such that it can be banded, taped, or bagged, with the overriding requirement that the folding not crease or distort the shirt such that it will retain its press for use by the wearer. From the standpoint of operation in a laundry, it is important that the machine be capable of being loaded by a relatively inexperienced operator such that practically any available worker can be assigned the task of operating the shirt-folding machine, with reasonable assurance that there is no likelihood of malfunctioning of the machine and possible damage to the shirt and/or the operator. Preferably, such relatively unskilled operator should be able to load the machine in a comparatively short period of time, without the need to remain in constant attendance as the machine goes through its automatic shirt-folding cycle. This enables the operator to perform another task, such as loading a companion unit, while the machine goes through its cycle.

Broadly, it is an object of the present invention to provide a shirt-folding machine and methods which realize one or more of the aforesaid objectives. Specifically, it is within the contemplation of the present invention to provide a machine and methods for folding shirts of varying sizes, styles, and materials on a mass production basis, while employing relatively unskilled operators requiring minimal manual dexterity. Advantageously, such machine and method produces a well folded shirt of a neat and attractive appearance which is substantially wrinkle free when unfolded.

In accordance with apparatus aspects of the present invention there is provided a machine for folding a shirt of the type including a collar, a shirt body having a tail portion and sleeves which comprise a support having a body form mounted thereon. The body form has a leading edge and opposite side edges and is adapted to receive a shirt board, as of cardboard, about which the shirt is folded. A collar clamp is mounted for movement between a loading position spaced from the body form to a clamping position overlying the body form wherein the collar clamp is engaged within the collar of the shirt when the latter is draped over the body form with the collar facing upwardly. A tail-folding bar is mounted for movement from a retracted position spaced below the body form through a tail-folding sequence to a tail-folding position wherein the tail-folding bar moves beneath the body form and folds the shirt body about the leading edge of the body form, with the tail portion thereof folded beneath the body form. Tail-clamping means are arranged beneath the body form and are operable in response to movement of the tail-folding bar to clamp the folded tail portion against the body form. First and second sleeve-folding arms are disposed in clearance positions at opposite sides of the body form and spaced respectively from the adjacent side edges thereof. First and second body-folding arms are disposed in draping positions at opposite sides of the body form and respectively arranged intermediate the adjacent side edge and the adjacent sleeve-folding arm. The sleeves of the shirt are adapted to be draped over the body-folding arms and extend downwardly between the adjacent body-folding and sleeve-folding arms. The sleeve-folding arms are mounted for movement through respective sleeve-folding sequences from the clearance positions to sleeve-folding positions beneath the body form, with the sleeves being respectively folded about the body-folding arms. Provision is made for moving the tail-folding bar through the tail-folding sequence, followed by the movement of the sleeve-folding arms through the respective sleeve-folding sequences into the sleeve-folding positions after the tail-folding bar has moved to the retracted position. Provision is made for then moving the body-folding arms from the draping positions to body-folding positions beneath the body form, with the opposite side portions of the shirt body and the folded tail portion being folded about the oppsite side edges of the body form. The body-folding arms are placed into operation only after the sleeve-folding arms have moved through their respective sleeve-folding sequences, into the sleeve-folding positions.

As a further feature of the invention, and when the machine is to be used in conjunction with short sleeve shirts, respective manually operable sleeve-folding means are provided which are engageable beneath the body-folding arms for folding the short sleeves about the body-folding arms in advance of automatic operation of the machine. Accordingly, when the random shirt assortment presents a short sleeve shirt to the machine operator, all the operator need do is manipulate the additional manually operable sleeve-folding means to fold the short sleeves in a preliminary step as part of the loading and draping of the shirt. When the machine is then placed into automatic operation, the automatically operable sleeve-folding means will move through the sleeve-folding sequence as if a long sleeve shirt were present in the machine, but will not engage the short sleeves. If the random selection next presents a long sleeve shirt, the operator is not required to manually operate the sleeve-folding means for the short sleeves which remain in their retracted clearance positions and the machine will go through a normal long sleeve shirt-folding cycle, as previously described.

Other apparatus features of the present invention include provision of a collar-clamping mechanism which holds the shirt during the folding operations and extends and shapes the collar incident thereto; anti-whip mechanisms which find particular application in the handling of long sleeve shirts, principally those including French cuffs to assure neat and wrinkle-free folding; a shirt-front clamping mechanism which engages the front strip of the shirt to avoid buckling and to further contribute to a neat folded package and a corresponding wrinkle free shirt for the wearer; and divers other mechanical innovations which will become apparent as the description proceeds.

In accordance with method aspects of the present invention, a long sleeve shirt is folded by draping the shirt over an elongated board and auxiliary supports disposed at the opposite sides thereof, with the tail portion depending from one end of the board, the opposite side portions of the shirt body overlying the auxiliary supports and the long sleeves depending from the outer edges of the auxiliary supports. This initial draping step is followed by the folding of the tail portion beneath the board and the auxiliary supports and about a transverse fold line coextensive with said one end of the board. After folding of the tail portion, the long sleeves are folded about the outer edges of the auxiliary supports. As a final step, the opposite side portions of the shirt body are folded beneath the board and about spaced longitudinal fold lines substantially coextensive with the opposite sides of the board. Thereupon, the folded shirt may be bagged and or banded in accordance with techniques which are genetrally understood.

In accordance with further method aspects of the present invention, a short sleeve shirt is draped in substantially the same manner but such short sleeves are folded about the outer edges of the auxiliary support, preliminary to folding the tail portion and of the opposite side portions of the shirt body as previously described.

The above brief description, as well as further objects, features and advantages of the present invention will be best appreciated by reference to the following detailed description of a presently preferred, but nonetheless illustrative embodiment in accordance with the present invention, and methods for folding of long and short sleeve shirts, when taken in conjunction with the accompanying drawings, wherein:

FIG. 13 is a fragmentary plan view showing the details of the collar-clamping mechanism which is illustrated in the retracted or loading position removed from the body form;

FIG. 14 is a side elevational view of the collar-clamping mechanism shown in the retracted or loading position, with parts broken away and sectioned, a shirt being draped on the body form and the tail-folding bar being shown during the tail-folding sequence solely for the purpose of illustration;

FIG. 17 is a fragmentary plan view of a shirt loaded in the machine and having the three collar-clamping jaws received within the neck band thereof prior to expansion and clamping of the shirt collar;

FIG. 18 is a view similar to FIG. 17, but showing the collar-clamping jaws after expansion and in the collar-clamping position wherein the jaws distend and shape the collar;

FIG. 19 is a fragmentary plan view, with parts broken away and sectioned, showing the details of the manually operable machine control illustrated with the starting handle in a neutral position;

FIG. 20 is a view similar to FIG. 19, but showing the starting handle in the operating or running position for the machine;

FIG. 21 is a fragmentary perspective view showing a short sleeve shirt draped over one of the body-folding arms, with the auxiliary manually-operable sleeve-folding arm in position to drape and fold the sleeve about the adjacent body-folding arm;

Figure 1:
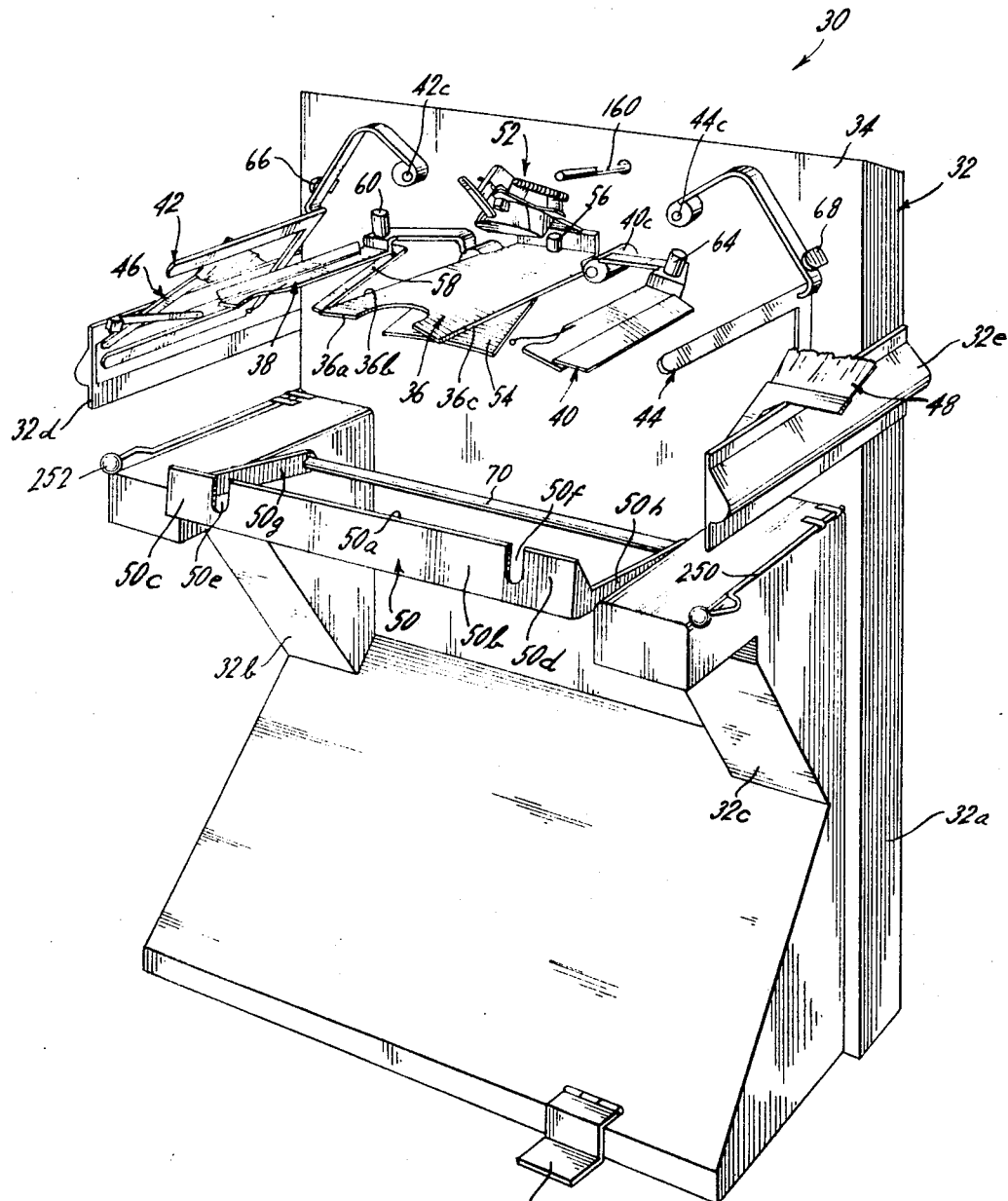
FIG. 1 is a perspective view of a shirt-folding machine embodying features of the present invention, shown in advance of loading and with the several folding members in their respective starting positions.

FIGS. 22A and 22B together comprise a schematic and diagrammatic showing of the controlling and acuating mechanisms for the present shirt-folding machines;

FIG. 23 is a perspective view of a modified anti-whip arrangement which may be incorporated in the present machine, with the full line showing of the shirt sleeve illustrating a typical loaded position for a French cuff shirt and the dotted line showing illustrating a typical loaded position for a conventional barrel cuff shirt; and, FIG. 24 is a sectional view taken substantially along the line 24—24 of FIG. 23 and looking in the direction of the arrows.

Preliminary reference will first be made to FIGS. 1 to 6 inclusive for a general description of a shirt-folding machine 30 demonstrating features of the present invention to facilitate a better understanding of the subsequent detailed description. The shirt-forming machine 30 includes a frame or housing 32 which supports and receives the various actuating and control mechanisms. Projecting forwardly from the upstanding main wall 34 of the main housing 32a is an elongated rectangular and substantially horizontal body form 36 having a leading end edge 36a and opposite side edges 36b, 36c, the leading end edge 36a being cut away at 36d. The body form 36 is adapted to support a shirt insert or board, such as the cardboard B shown in FIG. 5.

Figure 2:
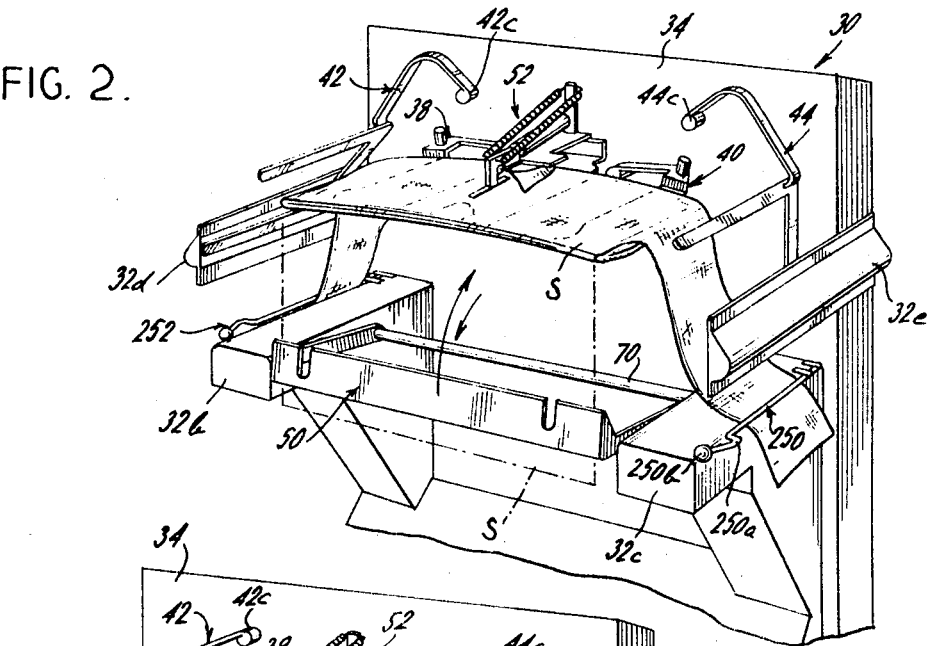
FIG. 2 is a fragmentary perspective view similar to FIG. 1 but on a somewhat reduced scale showing the shirt-folding machine having a shirt draped thereon, with the collar clamped and after the tail portion of the shirt has been folded beneath the body form and body-folding arms and preliminary to the sleeve-folding sequence.
Figure 3:
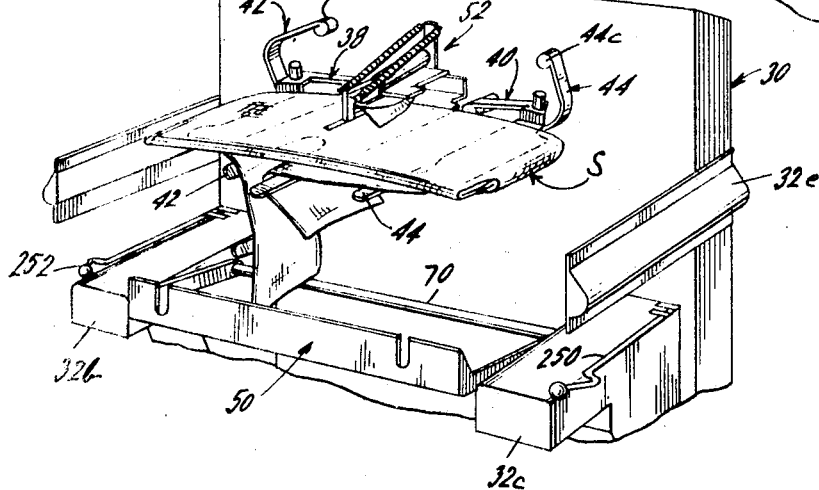
FIG. 3 is a perspective view similar to FIG. 2, but showing the shirt-folding cycle advanced to the point where the sleeve-folding arms have almost completed a sleeve-folding sequence during which the sleeves are folded about the outer edges of the body-folding arms and beneath the folded tail portion.
Figure 4:
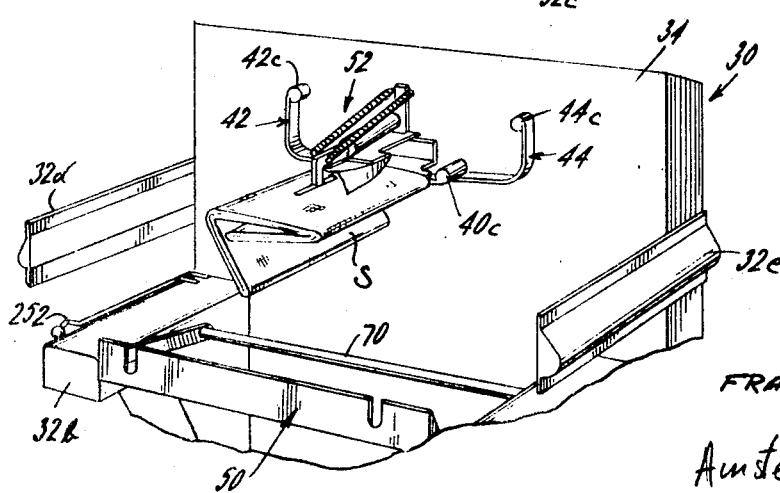
FIG. 4 is a perspective view similar to FIG. 3, but showing the shirt-folded cycle advanced to the point where the shirt is almost folded, with the body-folded arms illustrated in an intermediate position during the body-folding sequence.
Figure 5:
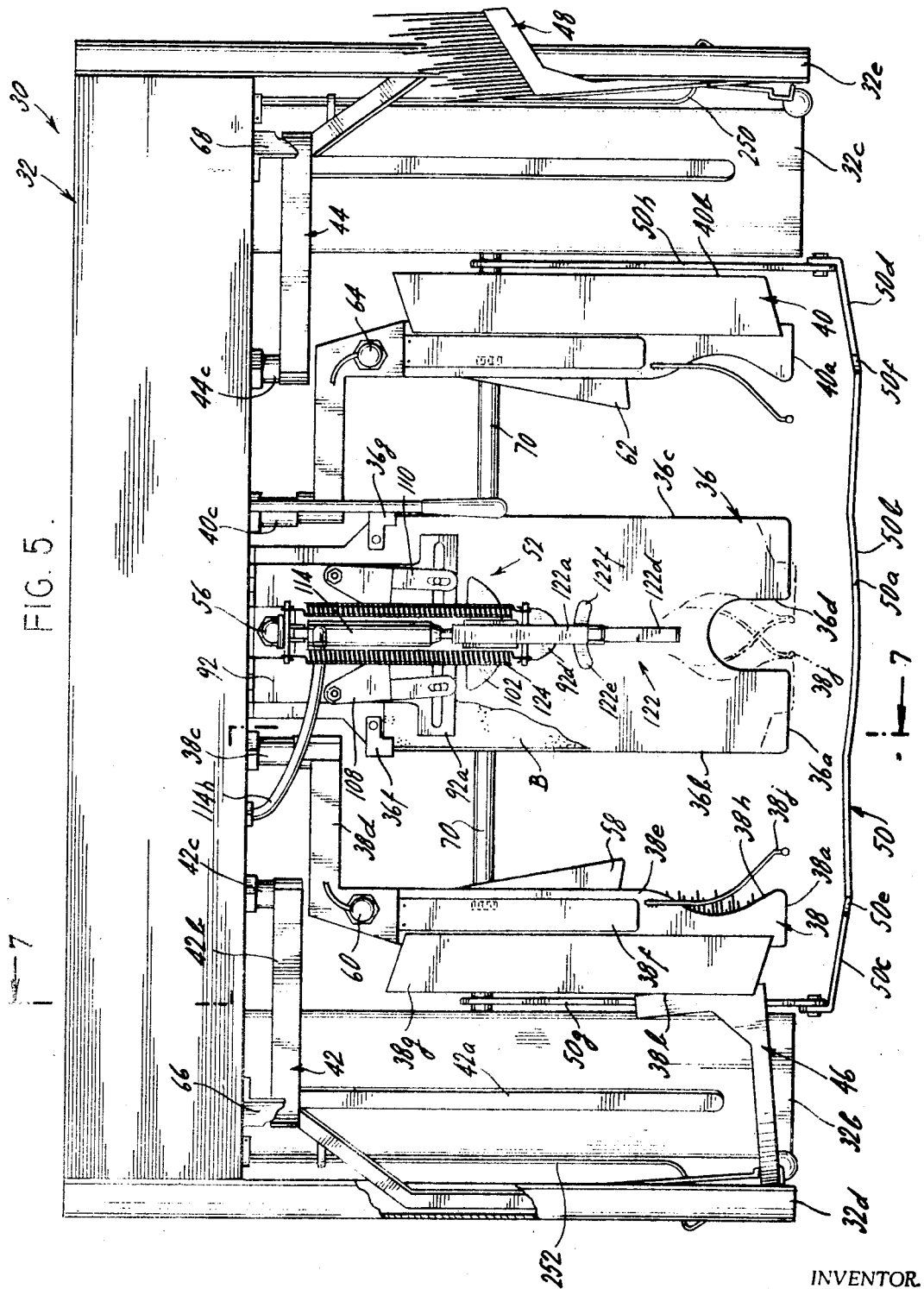
FIG. 5 is a top plan view of the shirt-folding machine, shown on an enlarged scale, with parts broken away and including a fragmentary showing of a shirt cardboard on the body form.

Disposed at opposite sides of the body form 36 in substantial coplanar relation therewith are first and second body-forming members or arms 38, 40. As seen in FIG. 5, the body-folding arms 38, 40 each have a leading end edge 38a, 40a in spaced end to end alignment with the leading end edge 36a of the body form 36 and respective outer side edges 38b, 40b. As seen in FIG. 2, the shirt S is draped over the body form 36 and the body-folding arms 38, 40, with the collar facing upwardly, the button hole and button strips superposed as if the shirt were buttoned, the tail portion depending from the aligned leading edges 36a, 38a, 40a, and the sleeves depending from the outer side edges 38b, 40b of the side-folding arms 38, 40. The FIG. 2 showing is of the shirt S after the tail portion thereof has been folded beneath the body form 36 and beneath the auxiliary supports provided by the body-folding arms 38, 40.

Disposed outwardly of the body-folding arms 38, 40 is a main or first set of sleeve-folding arms, 42, 44 which are normally disposed in respective clearance positions such that the sleeves of a long sleeve shirt may be draped in the path of movement thereof for folding, as shown in FIG. 2. Arranged outwardly of the respective sleeve-folding arms 42, 44 is an auxiliary or second set of sleeve-folding arms 46, 48 which may be manually operated when it becomes necessary to fold a short sleeve shirt, as will be subsequently described in conjunction with FIG. 21. The showing of the auxiliary or short-sleeve folding arms 46, 48 has been eliminated from the progressive illustrations of FIGS. 2 to 4 inclusive to simplify the drawings.

Disposed below and somewhat forwardly of the body form 36 is a tail-folding bar 50 which is operable to fold or tuck the depending tail portion of the shirt body beneath the aligned body form 36 and body-folding arms 38, 40, with the tail-folding bar 50 having a movable leading edge 50a cooperating with the aligned stationary leading edges 36a, 38a, 40a to fold the tail portion about such stationary leading edges.

Extending above the body form 36 is a collar distending and clamping mechanism 52 which is movable from a loading position (shown in FIG. 1) to an operative position (shown in FIGS. 2 to 5) inclusive wherein the spreadable jaws thereof are engaged within the neck band of the collar of the shirt to shape the collar and hold the shirt for the draping and molding operations, which will now be generally described.

As previously indicated, the shirt S is draped over the stationary body form 36 and the substantially coplanar movable body-folding arms 38, 40 substantially in the condition shown in FIG. 2, except that the tail portion thereof depends from the aligned leading edges 36a, 38a, 40a. Thereupon, the tail-folding bar 50 is swung through a tail-folding sequence from the retracted position (illustrated in FIGS. 2 to 5 inclusive) through an upwardly directed arc into a tail-folding position beneath the body form 36 and the body-folding arms 38, 40. The upward and return strokes of the tail-folding bar 50 during the tail-folding sequence illustrated schematically by the directional arrows in FIG. 2, while an intermediate position of the tail-folding bar is shown in FIG. 14. As will subsequently be described, provision is made for clamping the folded tail portion beneath the body form 36 and the body-folding arms 38, 40 such that the tail-folding bar 50 may be withdrawn to the retracted position. Thereupon the first and second sleeve-folding arms 42, 44 are moved from the respective clearance positions shown in FIGS. 1 and 2 through corresponding inward sweeps or strokes into superposed sleeve-folding positions illustrated in FIG. 3. As may be appreciated by progressively inspecting FIGS. 2 and 3, the second or right sleeve-folding arm 44 leads the first or left sleeve-folding arm 42 during the sleeve-folding sequence to avoid interference therebetween and to successively fold the sleeves beneath the folded tail portion. Following the sleeve-folding sequence for the illustrated long sleeve shirt, the first and second body-folding arms 38, 40 move from the draping positions illustrated in FIGS. 1 to 3 inclusive through respective inward sweeps or strokes into the body-folding positions beneath the body form 36, as may be appreciated by progressively inspecting FIGS. 3 and 4. The second or right body-folding arm 40 leads the first or left body-folding arm 38 during the body-folding sequence to successively fold the opposite side portions of the shirt body about the opposite side edges 36b, 36c of the body form 36. At the end of the folding machine cycle, and as subsequently will be described, provision is made to partially relieve the bearing pressure between the several folding members 38, 40, 42, 44 and the body form 36 and to automatically retract the collar-clamping mechanism 52 to enable the withdrawal of the folded shirt S and the board B wrapped therein from the body form 36. Such withdrawal is accomplished by the operator grasping the end of the folded shirt immediately adjacent the operator's position in the region of the cut-out 36d and pulling the folded shirt toward the operator whereupon the same slips off of the body form or mandrel 36. Having generally described the basic components of the present machine to facilitate a general understanding of a number of the related functions thereof, there now follows a detailed description of the illustrated mechanisms.

As seen best in FIGS. 13 to 16, the body form 36 includes a right angle extension 36e at its rearward end which is secured to the upstanding main wall 34 of the machine support or frame 32. In this illustrative embodiment, the body form 36 extends substantially horizontally and at right angles to the wall 34. In some instances, it has been found desirable to impart a slight upward pitch to the body form from the mounted end 36e to the leading edge 36a since such inclination may result in a more perfect folding action. Further, and as seen best in FIG. 6, the body form 36 is bowed upwardly between the opposite side edges 36b, 36c such that the holding action of the folding members 38, 40, 42, 44 will be exerted only contiguous to the opposite side edges 36b, 36c. This has been found to facilitate the withdrawal of the folded shirt or package from the body form or mandrel 36 and to contribute to a better folding action. Contiguous to its rearward end, the body form 36 is provided with left and right corner stops 36f, 36g which positions the shirt cardboard B in relation to the body-form for the folding of the shirt S thereabout.

Disposed beneath the body form 36 is a tail clamp 54 which is normally disposed in an open position to receive the folded tail portion of the shirt as the tail-folding bar 50 moves through its upward and forward stroke. The tail clamp 54 is movable under control of a clamp-actuating piston and cylinder assembly 56 into a clamping position bearing upwardly against the body form 36 and the interposed folded tail portion of the shirt S (see FIG. 16) in response to movement of the tail-folding bar into the tail-folding position. The tail clamp 54 includes a clamp body 54a underlying the body form 36 and shaped to conform generally thereto which is pivotally mounted by a rearwardly directed mounting arm 54b and hinge 54c interconnected between the arm 54b and the body form 36. The clamp-actuating piston and cylinder assembly 56 includes a piston 56a which is operable to swing the clamp body 54a in the counterclockwise direction about the hinge 54c to close the clamp 54 at the appropriate time during the shirt-folding cycle after the tail-folding squence.

Figure 6:
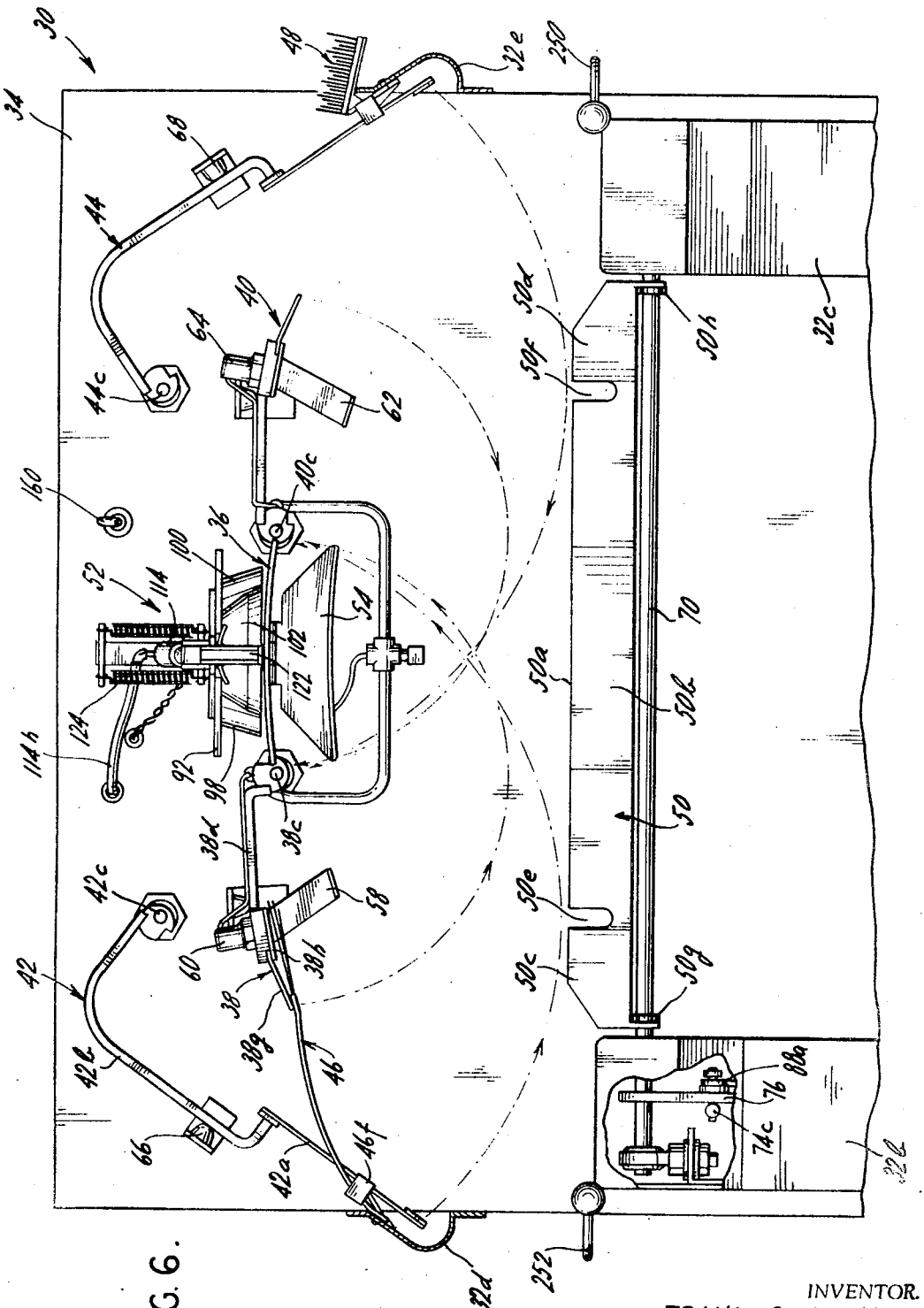
FIG. 6 is a front elevational view of the present shirt-folding machine, with parts broken away and with the dot-dash arrowed lines showing the respective paths of movement of the operative edges of the sleeve-folding arms and the body-folding arms.

As seen in FIGS. 1, 5 and 6, the body-folding arms 38, 40 are of identical construction and are mirror images of each other. Accordingly, it will suffice to describe only one in detail, with like reference numerals being applied to the other. The first or left body-folding arm 38 includes a pivot shaft 38c which is journalled on the upstanding main wall 34 and carries a laterally and outwardly projecting mounting arm 38d which supports a forwardly projecting main section 38e. Overlying the main section 38e is a resilient hold-down finger 38f which is adapted to have the adjacent side portion of the shirt 35 body slip therebeneath. Projecting outwardly and downwardly from the main section 38e is a lateral extension 38g which terminates in the outer side edge 38b about which the corresponding sleeve is folded. The inner side edge of the main section 38e is relieved away at 38h such that the body-folding arm 38 will not interfere with unloading (which is accomplished by grasping the multiple plies of the shirt overlying and underlying the cutout 36d), as may be appreciated by comparing the full and broken line showings in FIG. 5. Extending forwardly from the main section 38e inwardly of the cut-out 38h is a spring-like finger 38j which has a terminal end aligned with the leading edges 36a, 38a, 40a. The finger 38j contributes to defining an unbroken leading edge about which the shirt tail may be folded, yet does not interfere with the ultimate withdrawl of the shirt S from the body form 36, as likewise may be appreciated by inspecting the full and broken line showings in FIG. 5.

Underlying the body-folding arm 38 is a tail clamp 58 which includes (see FIG. 7) a clamp body 58a extending beneath the main section 38e, a rearwardly projecting arm 58b and a pivot 58c on the mounting arm 38d of the body-forming arm 38. The clamp body 58a is formed with upwardly directed teeth 58d which are engaged through a cut-out in the tail-folding bar 50 to grip the folded tail portion against the underside of the body-folding arm 38. A clamp-actuating piston and cylinder assembly 60 is mounted on the arm 38d, with the piston 60a thereof depending into engagement with the rearwardly projecting arm 58b of the tail clamp 58. An identical tail clamp 62 and clamp-actuating piston and cylinder assembly 64 is mounted on the second right body-folding arm 40 for movement therewith. As seen best in FIG. 6, flexible air lines are connected to the respective clamp-actuating means 56, 60, 64 associated with the three tail clamps 54, 58, 62.

The left and right main sleeve-folding arms 42, 44 are of identical construction and are mirror images of each other. Accordingly, it will suffice to describe only one of the sleeve-folding arms, with identical reference numerals being applicable to the other. The first or left sleeve folding arm 42 (see FIGS. 1, 5 and 6) includes a substantially U-shaped main section 42a mounted on an inwardly directed arm 42b connected to a pivot 42c journalled on the main wall 34 outwardly of and above the pivot 38c. The arm 42b is shaped to appropriately position the U-shaped main section 42a in a clearance position outwardly of the adjacent sleeve of the shirt. The spaced fingers of the U-shaped section 42a contact the sleeve at spaced apart transverse locations (see FIG. 3) to sweep the sleeve inwardly and beneath the body form 36, with the outer finger moving into bearing relation with the body form 36 contiguous to the edge 36c thereof (see FIG. 6). A stop 66 is positioned to abut the arm 42b of the main sleeve-folding arm 42 and a similar stop 68 is provided for the sleeve-folding arm 44. The stops 66, 68 may be adjustable to establish the outer limits of the arcuate travel of the respective sleeve-folding arms 42, 44.

Since the auxiliary or short sleeve-folding arms 46, 48 are manually engaged and do not participate directly in the automatic shirt-folding cycle, detailed description of such folding members and their use will be deferred.

The tail-folding bar 50 (see FIG. 1) is of U-shaped configuration and has respective body segments constructed and arranged to sweep beneath the body form 36 and the body-folding arms 38, 40 in substantially uniform wiping relation thereto to thereby provide a sharp fold of the tail portion of the shirt S about the aligned leading edges 36a, 38a and 40a. Specifically, the tail-folding bar 50 extends from side to side of the machine and has a medial body segment 50b which is of a curvature to conform to the bowing of the body form 36 and angled side body segments 50c, 50d inclined to cooperate with the correspondingly inclined body-folding arms 38, 40. The side body segments 50c, 50d are notched at 50e, 50f to provide clearance for the respective gripping fingers or serrations on the tail clamps 58, 62 which take over and hold the folded tail portion as the tail-forming bar 50 is retracted.

The tail-folding bar 50 includes rearwardly directed mounting arms 50g, 50h, which are secured to the opposite ends of the body 50b, 50c, 50d and are secured at their rearward ends to the tail-bar shaft 70. As seen best in FIGS. 1 and 5 to 7 inclusive, the tail-bar shaft 70 extends from side to side of the machine between the opposite side housings 32b, 32c. The tail-bar shaft 70 has its opposite ends journalled on appropriate bearings, such as shown in the left side housing 32b (see FIG. 6). Thus, the tail-folding bar 50 is mounted for arcuate movement from the retracted position (see FIG. 1) through the operative stroke of the tail-folding sequence to the tail-folding position (see FIG. 14) in response to turning movement being imparted to the tail-bar shaft 70. As seen best in FIG. 7 rocking motion is imparted to the tail-bar shaft 70 by a tail-bar actuating piston and cylinder assembly 74 which includes a cylinder 74a pivoted on the support or housing 32 at 74b. The assembly 74 has its piston 74c pivotally connected to a crank arm 76 which is secured to and projects rearwardly from the tail-bar shaft 70. As air is admitted into the pressure side of the piston and cylinder assembly 74, the cylinder 74a rocks about the pivot 74b and the piston 74c moves through its operative stroke to swing the crank arm 76 in the clockwise direction which brings about a corresponding turning movement of the tail-folding bar 50 through an upward and clockwise arc about the shaft 70 from the retracted position to the tail-folding position, as previously described and shown by the dot-dash lines in FIG. 7. The tail-folding bar 50 is returned to its retracted position by internal spring 74d within the cylinder 74a (see FIG. 22B), with the return bias being supplemented by a return spring 78 which is coupled to the crank arm 76 and is mounted on the support 32.

Figure 7:
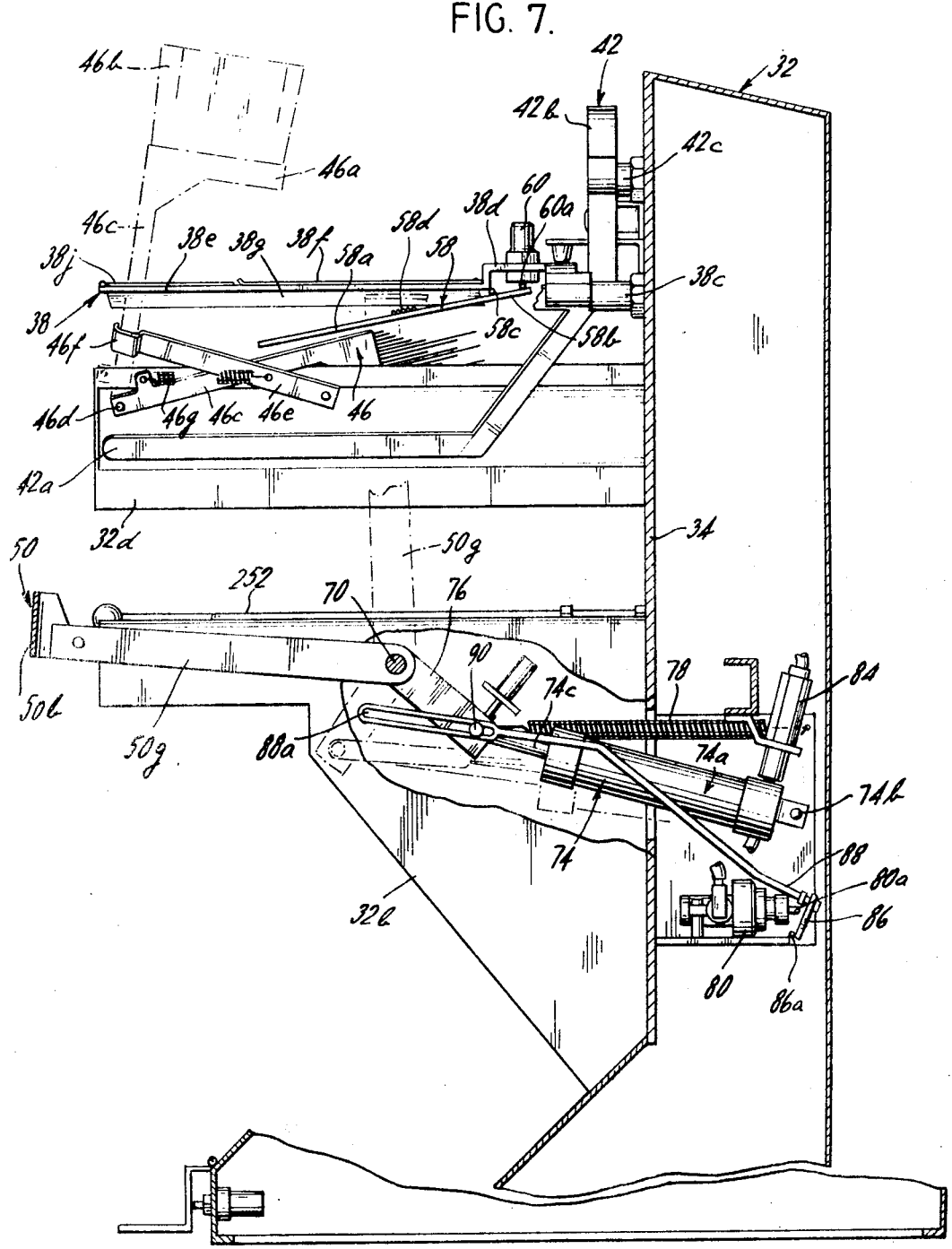
FIG. 7 is a sectional view taken substantially along the lines 7—7 of FIG. 5 and look in the direction of the arrows, with parts broken away and sectioned, showing constructional details including the manually operable auxiliary sleeve-folding mechanisms used for the preliminary folding of the short sleeve shirts.

The rocking motion of the cylinder 74a and the extension of the piston rod 74c are employed to initiate several control functions in the shirt-folding cycle, as will be described in detail in connection with FIGS. 22A, 22B. For the present purposes, it will suffice to observe that the motion of the piston and cylinder assembly 74 from the full line position to the broken line position illustrated in FIG. 7 is operable to actuate a self-locking pilot-operated valve 80, a valve-porting cylinder and piston assembly 82 (shown in FIG. 22B) and a sequencing valve 84. Since these elements are conventional and well known pneumatically-operated devices, their detail description will be dispensed with in the interest of brevity. Specifically, a valve-operating member 86 is pivotally mounted on an appropriate support at 86a and is coupled by link 88 to the crank arm 76 via a lost motion connection which includes a pin 90 on the crank arm 76 riding within an elongated slot 88a in the coupling link 88. The pin-and-slot of the lost motion connection are arranged, as may be best appreciated by inspecting the full and broken line showings in FIG. 7, to rock the valve-operating member 86 in the counterclockwise direction about its pivot 86a at the end of the operative stroke of the tail-folding bar 50 to actuate the self-locking, pilot-operated valve 80 by depressing the valve actuator 80a. The sequencing valve 84 is normally held open by the cylinder 74a of the assembly 74, is closed in response to movement of the cylinder from the full line position to the broken line position, and is reopened as the cylinder 74a returns to the full line position wherein the shirt-folding bar 50 is in its retracted position. Upon restoration of the cylinder 74a to the normal position, the sequencing valve 84 is effective to initiate the next phase of the shirt-folding cycle, as will be subsequently described. Appropriate adjustable stops are associated with the tail-folding mechanism to permit adjustment of the normal and/or retracted positions the operative stroke, and the like.

Reference will now be made to FIGS. 13 to 18 inclusive for a description of the collar-clamping mechanism 52 which distends, shapes and clamps the collar of the shirt and includes a manually movable clamp carrier 92 mounted on a frame for movement into and out of the clamping position. Specifically, the clamp carrier 92 is pivotally mounted on the upstanding wall 34 by hinges 94, 96 and carries three collar-clamping jaws 98, 100, and 102. With the carrier in the depressed clamping position, the collar-clamping jaws 98, 100, 102 are mounted for movement from a retracted position relative to each other (see FIGS. 14 and 17) to an extended clamping position (see FIGS. 15, 16 and 18). As seen best in FIGS. 17 and 18, the side by side collar-clamping jaws 98, 100 have profiled forming faces 98a, 100a which engage the neckband of the collar at the opposite sides and rear of the collar, while the collar-clamping jaw 102 has a profile-forming face 102a which engages the neckband of the collar at the opposite sides of the collar button. The clamping jaws 98, 100 extend to the opposite sides of a line of symmetry through the collar from the collar button to the rear edge thereof, while the clamping jaw 102 has symmetrical sections on the opposite sides of such line of symmetry. Appropriate heaters, such as the heater 104 associated with the jaw 98, are mounted within the respective collar-clamping jaws for maintaining the jaws at an elevated temperature during operation of the machine for heating the collars during distending, shaping and clamping thereof. The actuating mechanisms associated with the collar-clamping jaws 90, 100, 102 are arranged such that the side by side jaws 90, 100 move at right angles to the line of symmetry and away from each other into their respective clamping positions, followed by the movement of the clamping jaw 102 along the line of symmetry into its expanded clamping position. As the jaws move from the retracted positions (illustrated in FIG. 17) to the expanded clamping positions (illustrated in FIG. 18), the jaw projections 98b, 100b, 102b extend over the collar and the profiled forming faces 98a, 100a, 102a engage the neckband for the shaping and clamping functions. In the illustrative arrangement, the collar-clamping jaws are configurated to provide a so-called sleeping collar, that is one wherein the collar tends to lie downwardly against the folded shirt. However, with minor modification, it is possible to adapt the instant machine to provide a so-called stand-up collar wherein the rear of the collar extends at an angle to the folded shirt.

Reference will be made to FIGS. 13 to 16 inclusive for a detailed description of the pneumatically- controlled actuating mechanisms for spreading and retracting the respective collar-clamping jaws 98, 100, 102. The pivoted clamp carrier 92 is seen to include a cross head 92a at its forward end which is provided with aligned transversely extending slots 92b, 92c. Lying beneath the slot 92b and the adjacent end of the cross head 92a is the collar-clamping jaw 98 which is suspended for transverse movement by the provision of a headed mounting bolt 98c and an actuating pin 98d. In a similar fashion, the collar-clamping jaw 100 is suspended beneath the opposite end of the cross head 92a by the headed mounting bolt 100c and the actuating pin 100d. Further, the clamp carrier 92 includes a forwardly projecting extension 92d which is formed with a longitudinal slot 92e which serves to suspend the collar-clamping jaw 102 for movement along a path at right angles to the paths of movement of the jaws 98, 100.

Overlying the clamp carrier 92 is a ram member 106 which is slidable lengthwise of the clamp carrier 92 and extends medially thereof. The ram member 106 includes an enlarged head 106a at the rearward end thereof and a forwardly directed bar 106b which terminates in upstanding ears 106c, 106d. The bar 106b intermediate the ears 106c, 106d carries a pair of depending mounting studs 106e, 106f (see FIG. 14) which project downwardly through the longitudinal slot 92e in the extension 92d and serve to suspend the collar-clamping jaw 102 for movement and to actuate the same, as will be subsequently described.

Disposed at the opposite sides of the ram member 106 are respective actuating arms 108, 110 for the collar-clamping jaws 98, 100 which are mounted at arm pivots 108a, 110a for rocking movement in coplanar relation towards and away from each other. At their inner sides, the actuating arms 108, 110 carry follower rollers 108b, 110b which are respectively engaged by cams 106g, 106h arranged symmetrically on the rearward head 106a of the ram member 106. A spring 112 engages the actuating arms 108, 110 to bias the follower rollers 108b, 110b into engagement with the respective cams 106g, 106h. The cams 106g, 106h are arranged to rapidly spread the collar-clamping jaws 98, 100 as the ram member 106 is moved through its operative or forward stroke, that is from the illustrated position in FIGS. 13 and 14 to the right and into the illustrated positions in FIGS. 15 and 16. Simultaneous with the spreading of the jaws 98, 100, the jaw 102 is thrust forwardly in that it is directly connected to the ram member 106, but the mechanisms are arranged such that the jaws 98, 100 engage the opposite sides and rear of the collar prior to engagement of the jaw 102 with the collar in the region contiguous to the collar button at the forward side of the neckband.

Operatively connected to the ram member 106 is a collar clamp-actuating piston and cylinder assembly 114 which includes a cylinder 114a pivotally mounted at 114b on an upstanding supporting plate 116. The piston rod 114c of the assembly 114 is connected via a cross pin 114d to the upstanding ears 106c, 106d of the ram member 106. The cross pin 114d is confined within an elongated slot formed in the ears 106c, 106d.

Underlying the piston and cylinder assembly 114 is a clamp activating valve 118 which is mounted on the upstanding wall 34 and the mounting plate 116 and is connected to a source of air under pressure, as will be described in connection with FIGS. 22A and 22B. Depending from the cylinder 114a at the pressure end thereof is a coupling elbow 114f which moves into engagement with the clamp-activating valve 118 to open the same and to connect the pressure side of the cylinder 114a to the source of air under pressure in response to movement of the clamp carrier and the piston and cylinder assembly 114 from the retracted or loading position (illustrated in FIGS. 13 and 14) to the clamping or operative position (illustrated in FIGS. 15 and 16). Thus, air is automatically connected to the pressure side. of the cylinder 114a which will drive the piston head (not shown) and the piston rod 114c through its operative stroke to impart a corresponding forward thrust to the ram member 106 for spreading the collar-clamping jaws 98, 100 and 102. The pressure side of the cylinder 114a is connected via an elbow 114g and a flexible tube 114h to a collar clamp-exhaust 120 (seen in FIG. 22B) which ports the collar clamp-actuating piston and cylinder assembly 114 to the atmosphere at the appropriate time during the machine cycle.

Pivotally mounted on the forward end of the ram member 106 is a button strip clamp, generally designated by the reference numeral 122, which is seen to include a suspending head 122a which extends between the upstanding ears 106c, 106d of the ram member 106 and is pivoted at its rearward end on the cross pin 114d connected to the piston rod 114c. The suspending head 122a is provided with an arcuate guide slot 122b which is engaged by a guide pin 122c extending between the ears 106c, 106d. Extending below the suspending head 122a is a bowed resilient button strip clamp body 122d which is fabricated of a flexible material and is of an extent to engage the shirt S in the region of the button strip to thereby retain the superposed button and button hole strips of the shirt S and to maintain the same against buckling during the shirt-folding operation. Conveniently, oppositely directed finger pieces 122e, 122f are provided above the button strip clamp 122 such that the operator may manually depress the button strip clamp 122 and simultaneously pivot the clamp carrier 92 and the various mechanisms mounted thereon into the collar-clamping position. The pin-and-slot mounting arrangement for the button strip clamp 122 is such that there is a toggling action thereof relative to the ram member 106 and the piston and cylinder assembly 114, which is supplemented by the forces exerted incident to the operation of the collar-clamping mechanisms whereby the assembly is maintained in the operative position illustrated in FIGS. 15 and 16 until such time as the piston and cylinder assembly 114 is ported to the atmosphere. Thereupon the return springs 124, 126 are automatically operative to return the entire collar-clamping mechanism 52 to the retracted of clearance position for the next shirt-draping operation by the machine operator.

Figure 11:
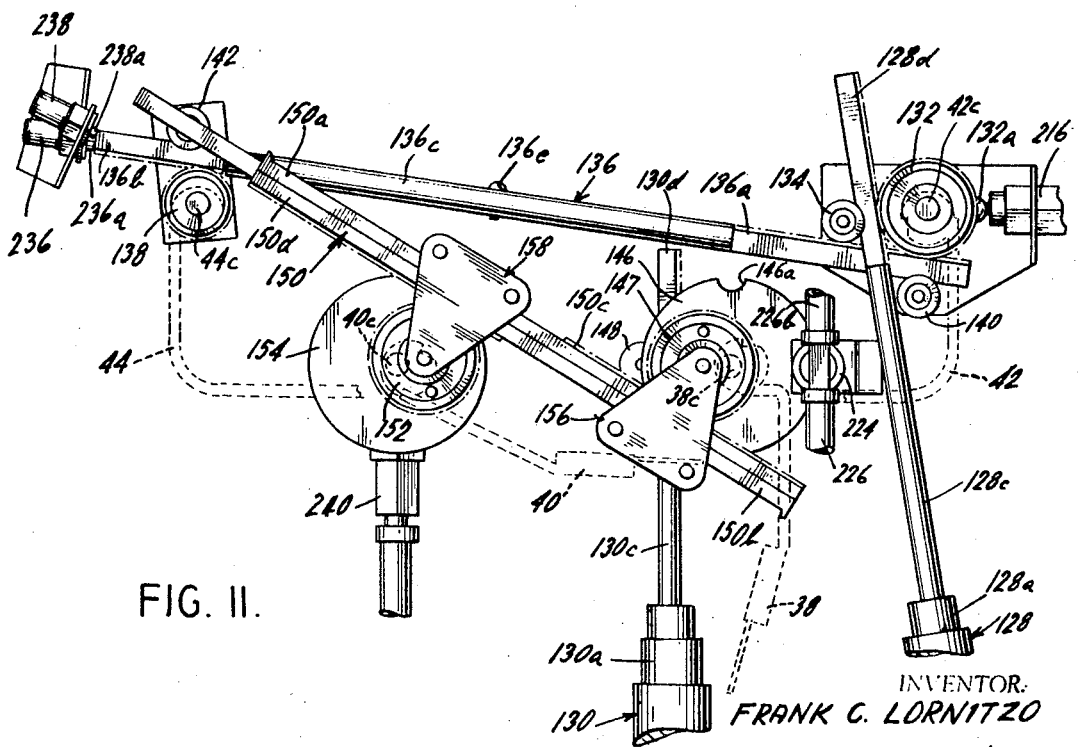
FIG. 11 is a fragmentary rear elevational view similar to FIG. 10 showing the mechanisms in an intermediate position during the body-folding sequence, with the body-folding arms being shown by the dotted lines and in the corresponding intermediate position.
Figure 12:
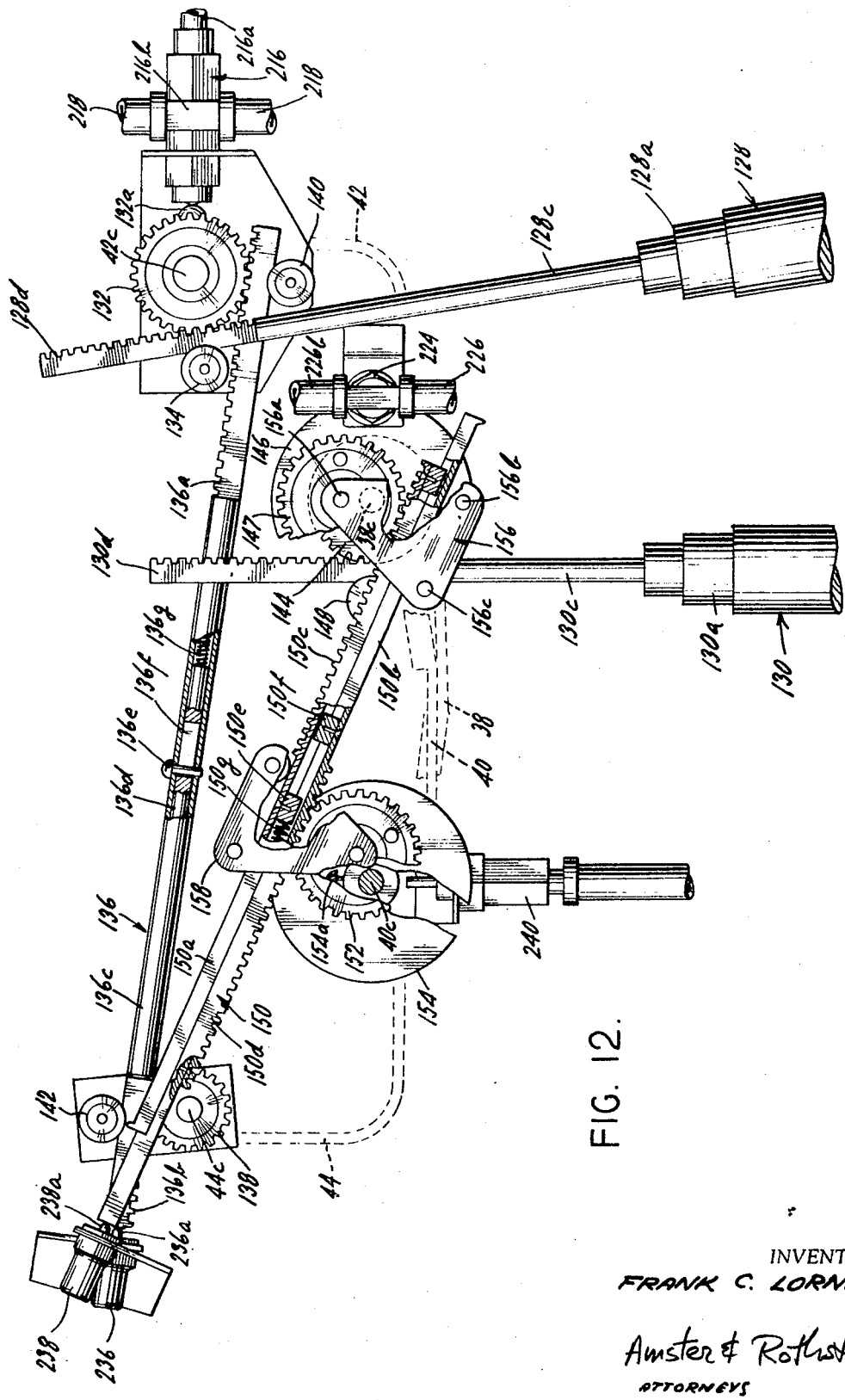
FIG. 12 is a fragmentary rear elevational view similar to FIG. 9, but showing the mechanisms at the end of the shirt-folding sequence, with the respective sleeve-folding arms and the body-folding arms in their operative positions.
Figure 15:
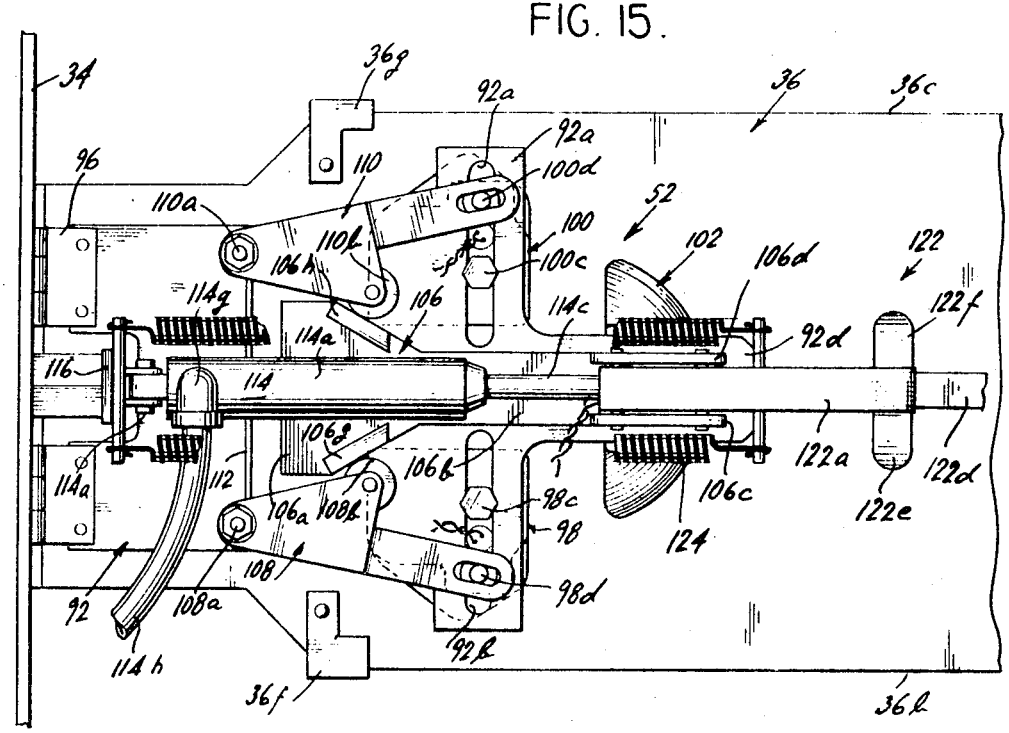
FIG. 15 is a plan view similar to FIG. 13, but showing an expanded position for the three collar-clamping jaws.
Figure 16:
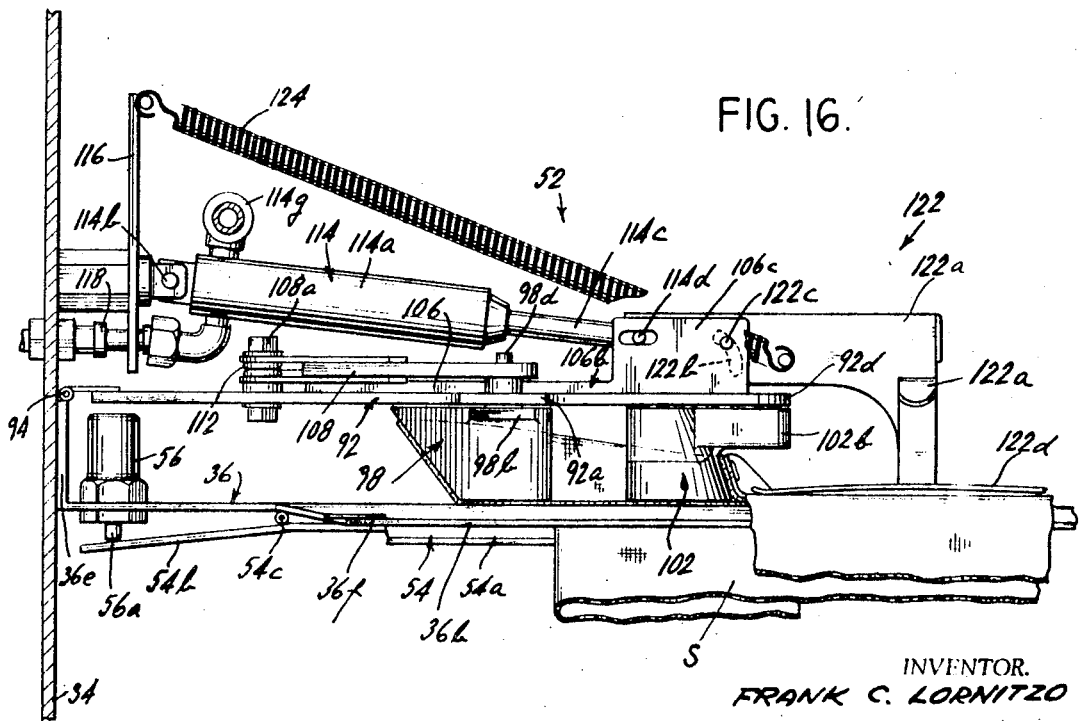
FIG. 16 is a view similar to FIG. 14, showing the expanded collar-clamping jaws in engagement with the collar of the shirt and the button clamp in engagement with the button strip thereof.

Reference will now be made to FIGS. 8 to 12 inclusive for a description of the pneumatically controlled actuating mechanisms for moving the sleeve-folding arms 42, 44 through the sleeve-folding sequence followed by the movement of the body-folding arms 38, 40 through the body-folding sequence. The body-folding arms 42, 44 are actuated by a first or sleeve-folding actuating piston and cylinder assembly 128, while the body-folding arms 38, 40 are actuated by a second or body-folding actuating piston and cylinder assembly 130. The coordination and control of the respective piston and cylinder assemblies 128, 130 will be best appreciated by reference to the diagrammatic showing of FIGS. 22A and B and for the movement it will suffice to describe the respective mechanical arrangements bearing in mind the general sequence of operations previously described. The cylinder 128a is mounted on the support 32 at a cylinder pivot 128b and the piston rod 128c thereof includes a driving rack 128d which meshes with a pinion 132 secured to the pivot shaft 42c of the sleeve-folding arm 42. Idler wheel 134 maintains the driving rack 128d in meshing engagement with the pinion 132. The pinion 132 is connected via a coupling linkage 136 to a driven pinion 138 connected to the pivot shaft 44c of the other sleeve-folding arm 44. Appropriate idlers 140, 142 engage the coupling linkage 136 to maintain the respective rack segments 136a, 136b in meshing engagement with the associated pinions 132, 138. Thus, as the piston rod 128c moves through its operative stroke, the rack 128d drives the pinion 132 in the clockwise direction (when viewed from the rear of the machine) to bring about a corresponding counterclockwise turning of the sleeve-folding arm 42 (when viewed from the front of the machine), and via the coupling linkage 136, the pinion 138 is turned in the counterclockwise direction to bring about a corresponding clockwise turning movement of the sleeve-folding arm 44 (when viewed from the front of the machine). The pinion 132 has a greater number of teeth than the pinion 138 such that the linear movement of the coupling linkage 136 will turn the pivot shaft 44c through a greater angle than the pivot shaft 44c to advance the arm 44 through its stroke in leading relation to the arm 42. During the sleeve-folding sequence, it will be recalled that the folding arm 44 leads the folding arm 42 (FIG. 3), and thus will come into bearing engagement with the folded shirt tail and the body form 36 in advance of the trailing sleeve-folding arm 42. Accordingly, the coupling linkage 136 is constructed such that the end of the folding traverse of the leading sleeve-folding arm 44 will not interfere with the completion of the traverse of the trailing sleeve-folding arm 42. Specifically, the coupling linkage 136 is of telescoped construction and includes an outer sleeve 136c which carries the driving rack 136a and has a slidable rod 136d therein which carries the driven rack 136b. The sliding movement of the rod 136d within the sleeve 136c is limited by the provision of a pin 136e on the sleeve 136c which extends through a slot 136f formed in the rod 136d. A spring 136g is disposed within the sleeve 136c and bears against the adjacent inner end of the rod 136d to spread the driven rack 136b relative to the driving rack 136a to illustrated limited position. Accordingly, when the leading sleeve-folding arm 44 is restrained by abutment with the body form 36 thereby blocking further turning movement of the pinion 138 by the driven rack 136b, the sleeve 136c will over travel (moving towards the left in FIG. 9) to permit the piston and cylinder assembly 128 and the pinion 132 to complete the operative stroke for the trailing sleeve-folding arm 42. This action is best appreciated by successively referring to FIGS. 9 through 12 inclusive which in dotted line progressive positions of the leading and trailing sleeve-folding arms 44, 42, with the FIG. 9 position showing the start of a sleeve-folding sequence, the FIG. 10 position showing an intermediate position and FIGS. 11 and 12 showing the final position of the leading and trailing sleeve-folding arms.

The second or body-forming actuating piston and cylinder assembly 130 includes a cylinder 130a which is pivoted on the machine support 32 at 130b and has a piston rod 130c which carries a rack 130d in meshing engagement with a pinion 144 which is mounted on the pivot shaft 38c concentric with and fixed to a disc 146. The disc 146 carries an eccentrically mounted output pinion 147. The rack 130d is maintained in meshing engagement with the pinion 147 by an idler 148. The pinion 147 is connected via a coupling linkage 150 to a further pinion 152 eccentrically mounted on a disc 154 secured to the pivot shaft 40c of the other body-folding arm 40. An idler assembly 156 cradles the coupling linkage 150 against the disc 146 and is pivoted at 156a coaxially of the pinion 147. The idler assembly 156 includes idlers 156b, 156c which engage the coupling linkage 150 at the side thereof remote from the pivot 156a. A similar idler assembly 158 is associated with the coupling linkage 150 to cradle the same against the disc 154. Once again, due to the fact that the body-folding arm 40 leads the body-folding arm 38 there is a necessity to permit continued rotation of the pinion 147 after the pinion 152 is arrested by contact of the leading body-folding arm 40 with the body form 36 to enable the drive of the body-folding arm 38 through the final phase of its operative stroke. To this end, the coupling linkage 150 includes a longitudinally extending side by side members or parts 150a, 150b which are mounted for sliding movement relative to each other, with the part 150a having the driving rack 150c and the part 150b having the driven rack 150d. The part 150a carries a stop 150e which bears against the stop 150f on the part 150b, with a spring 150g biasing the stops against each other until there is a necessity for the part 150a to overtravel to the left (compare FIGS. 9 and 12) when the part 150b is arrested incident to the body-folding arm 40 coming into its final position bearing against the body form 36.

The uniform drive of the rack 130d is transformed into varying rates of drive for the leading body-folding arm 40 and the trailing body-folding arm 38 by the eccentric mounting of the pinions 147, 152. At the start of operation (see FIG. 9), it will be appreciated that the effective driving arm for the rack 150c is large as compared to the driving arm for the pinion 152, and accordingly for each increment of moving of the rack 130d there will initially be correspondingly larger turning movement of the leading body-folding arm 40 as compared to the trailing body-folding arm 38. As the coupling linkage 150 moves towards the left in FIG. 9, and as may be appreciated by progressively inspecting FIGS. 10 to 12 inclusive, the relationship of the effective driving arms for the respective racks 150c, 150d changes in an opposite sense to establish the proper relationship between the arms 40, 38, with the coupling linkage 150 eventually coming into operation to permit the completion of the drive of the body-folding arm 38 into its final position.

Having described the general mode of operation of the machine 30 and the several folding mechanisms and their respective pneumatic actuating means, there now follows a description of most of the remaining components of the machine, preliminary to the detailed description of the control illustrated in FIGS. 22A and B. Referring now to FIGS. 1, 19 and 20, the machine 30 is seen to include a control handle 160 which projects forwardly from the main wall 34 above the collar-clamping mechanism 52. The control handle 160 is arranged to selectively operate a self-locking, pilot-operated valve 162 and a cycle-abort valve 164, both of which are mounted on a supporting bracket 166 which projects rearwardly from the wall 34 and is secured thereto. As the control handle 160 is rocked to the right in FIGS. 1, 19 and 20, it is operable to actuate the valve 162 for initiating a shirt-folding cycle; and as the handle 160 is rocked to the left, it is operative to abort the shirt-folding cycle. A lockout piston and cylinder assembly 168 is provided to preclude operation of the control handle 160 at a predetermined time in the shirt-folding cycle, as will be subsequently described. The control handle 160 includes a hand grip 160a which projects forwardly of the wall 34, a mounting head 160b which projects rearwardly thereof, and a fulcrum plate 160c which bears against the rearward side of the upstanding leg of the mounting bracket 166. The control handle 160 is mounted for side to side rocking movement in a substantially horizontal plane by the provision of an upstanding pivot 160d which is confined within a slot 160e extending longitudinally of the mounting head 160b. The fulcrum plate 160c is biased against the adjacent wall by the provision of a spring 160f which bears at one end against the fulcrum plate 160c and at the other end against an abutment 160g. Normally, the fulcrum plate 160c lies against the abutting wall of the support, as illustrated in FIG. 19. The machine cycle is initiated when the operator grasps the hand grip 160a and pivots the control handle 160 in the counter-clockwise direction (as viewed from above) such that the end of the fulcrum plate confronting the valve 162 depresses the actuator 162a thereof, as shown in FIG. 20. The shirt-folding cycle may be aborted by rocking the control handle 160 in the opposite direction whereupon the end of the fulcrum plate 160c confronting the cycle-abort valve 164 will contact the actuator 164a thereof to abort the shirt-folding cycle. The control handle 160 is locked against rocking movement to initiate a shirt-folding cycle when the lock-out piston and cylinder assembly 168 is operated to bring the plunger 168a into the position shown by the dotted lines in FIG. 19.

Figure 8:
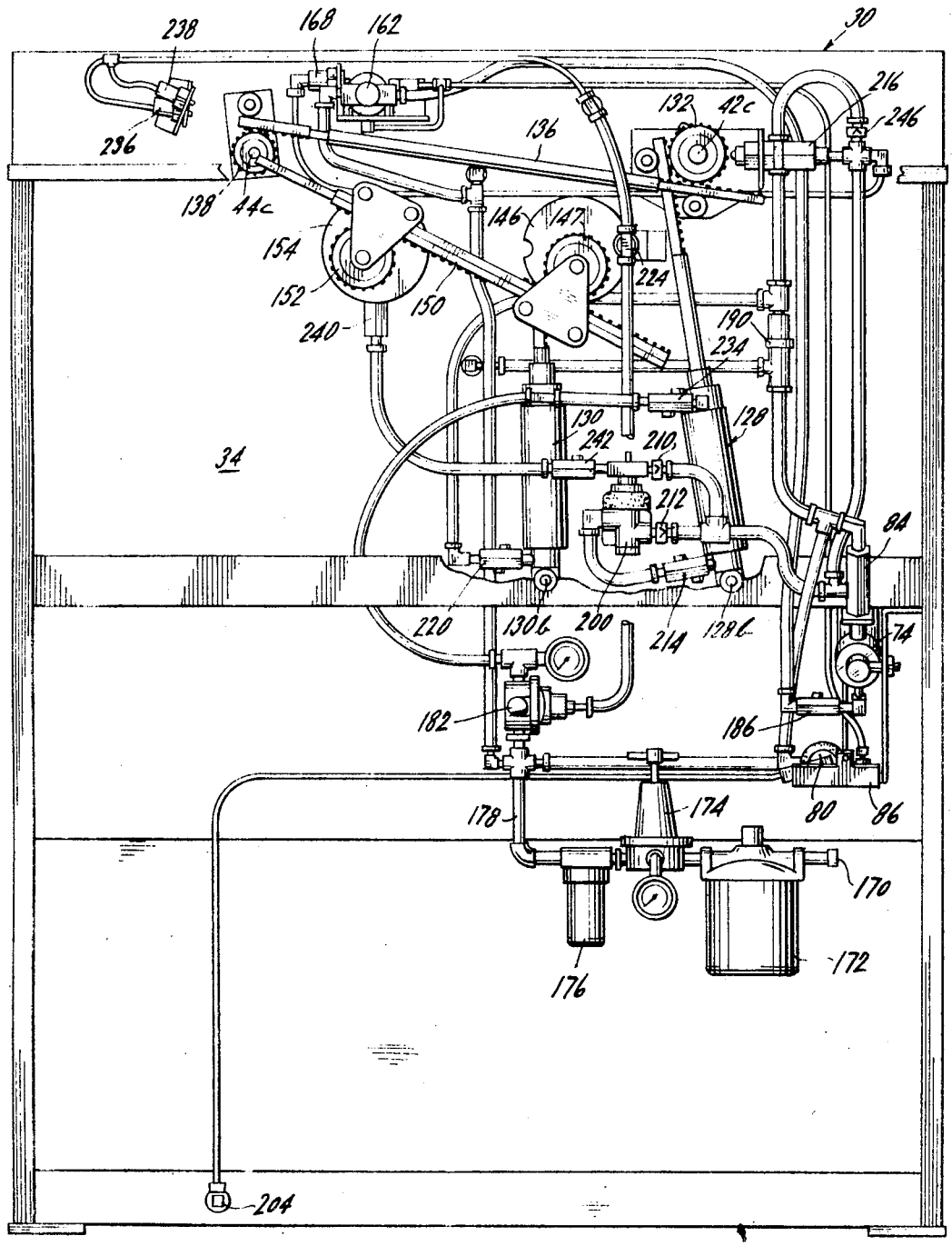
FIG. 8 is a rear elevational view of the shirt-folding machine, showing the details of the pneumatically-controlled actuating and sequencing mechanisms.
Figure 9:
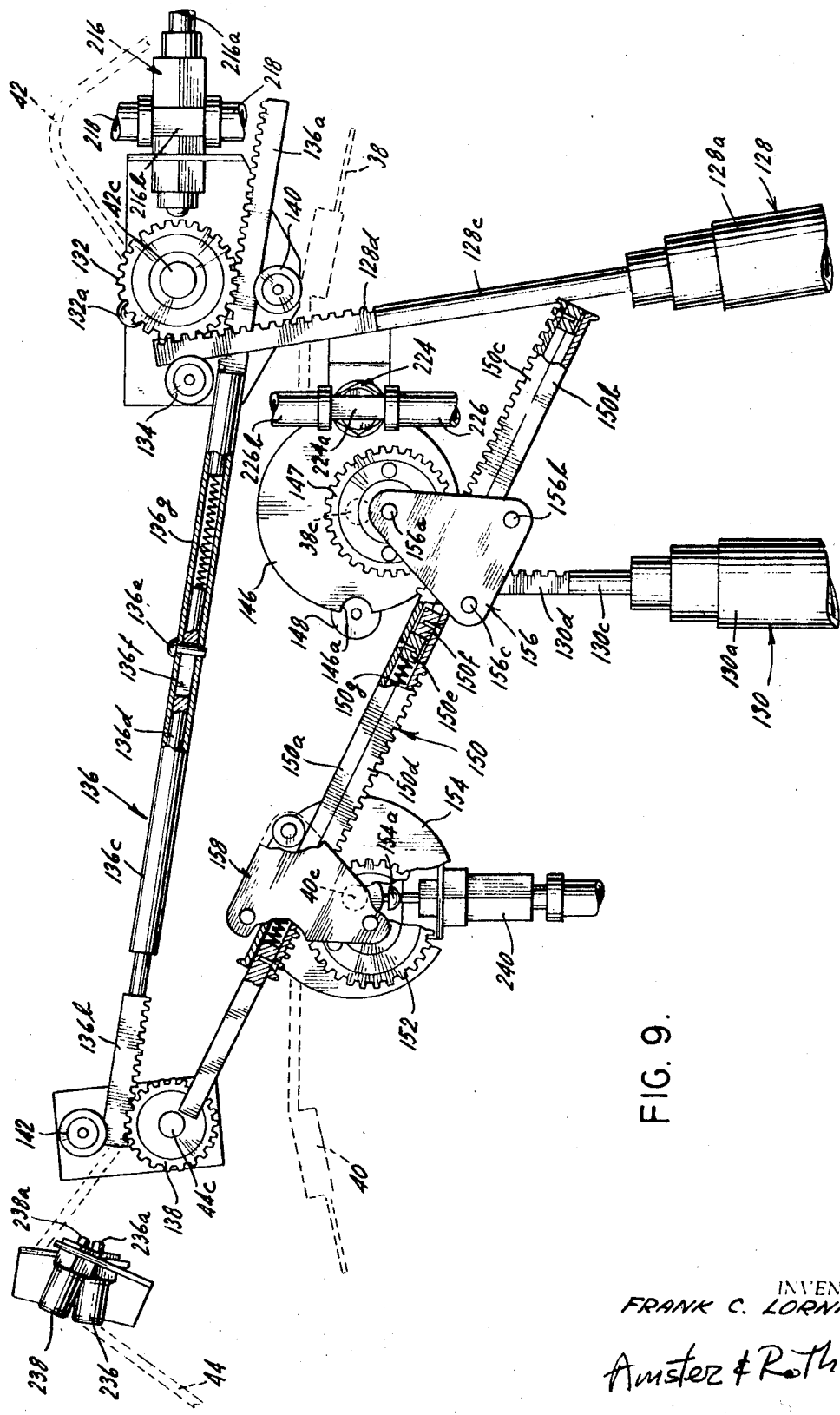
FIG. 9 is a fragmentary rear elevational view, with parts broken away and on an enlarged scale, showing the respective actuating mechanisms for the sleeve-folding arms and the body-folding arms, said arms being shown by the dotted lines and the mechanisms and the arms being illustrated in the starting position corresponding to FIGS. 1 and 8.
Figure 10:
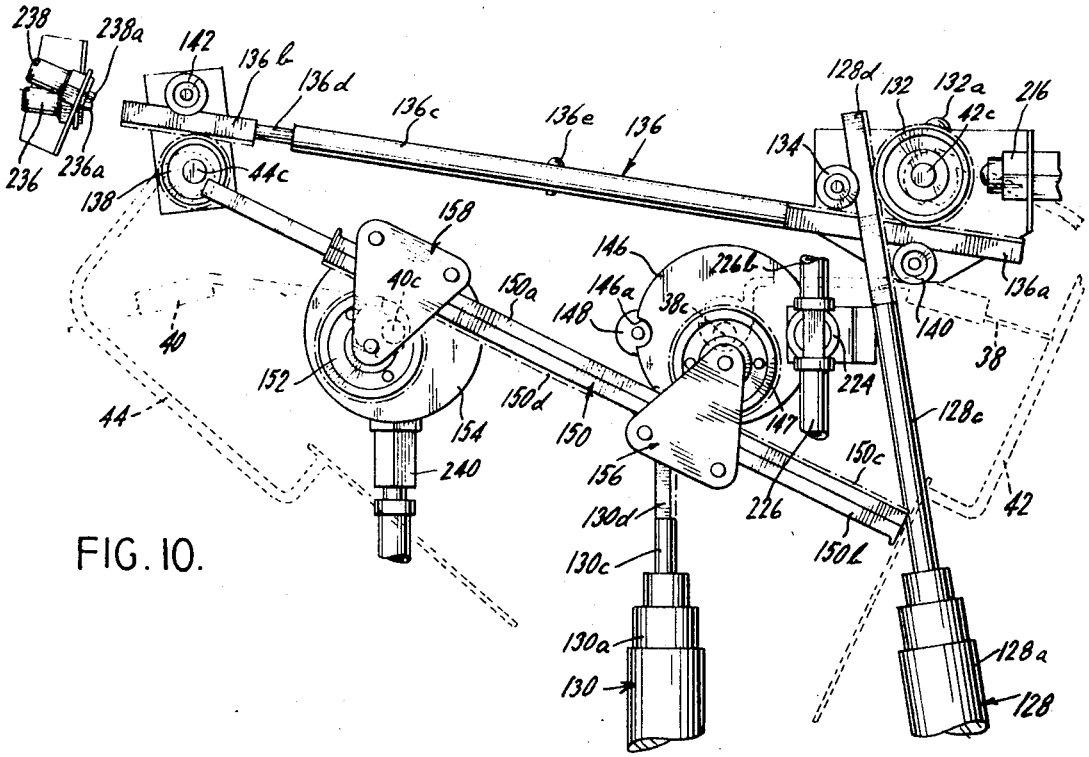
FIG. 10 is a fragmentary rear elevational view similar to FIG. 9, but showing the mechanisms in an intermediate position during the movement of the sleeve-folding arms through the sleeve-folding sequence, the intermediate position of the sleeve-folding arms being shown by the dotted lines.

Referring to FIG. 8, it will be seen that air under pressure is introduced into the pneumatic actuating and control mechanisms for the machine 30 from an air inlet 170 through a filter 172, a pressure regulator 174 and a lubricator 176 to a main distribution line 178 from which connections are made by appropriate branch lines to the previously described piston and cylinder assemblies and related valves. It should be noted that several additional valves are incorporated into the system, which will be described in conjunction with FIGS. 22A, 22B. Since the description of the remainder of the actuating and control mechanisms will be more meaningful in conjunction with FIGS. 22A and B, reference will now be made to these figures for a description of such remaining components and the coordination of the actuating means. The remaining mechanical components shown diagrammatically in FIGS. 22A and B are found on the machine 30 and are designated by corresponding reference numerals, and in most instances are well known per se and require no detail description as such.

Referring now to FIGS. 22A and B, it is seen that the main air distribution line 178 is connected via branch 178a to the piston and cylinder assembly 114 of the manually-positioned, collar-clamping and distending mechanism 52, via the branch 178b to the air inlet 162b of the manually-controlled valve 162, and via the branch 178c to the air inlet of the self-locking pilot-operated valve 80. Additionally, the main distribution line 178 has a branch connection 178d to a pressure-gauge 180 which indicates the line pressure in the main distribution line as established by the pressure regulator 174. Further, there is a branch connection 178e to a pressure-relieving regulator 182 associated with the respective piston and cylinder assemblies 128, 130.

After the collar-clamping distending mechanism 152 is depressed into the clamping position, as by the operator depressing the finger pieces 122e, 122f with the left hand, the automatic shirt-folding cycle is initiated by rocking the control handle 160 in a direction to depress the actuator 162a of the valve 162. The valve 162 has its air outlet 162c connected via line 184 and needle valve 186 to the pressure side of the cylinder 74a of the tail-bar actuating piston and cylinder assembly 74. Movement of the cylinder 74a from the full line normal position to the dotted line displaced position is effective via the link 88 and the valve-operating member 86 to depress the actuator 80a of the valve 80 and to simultaneously depress the actuator 82a of the valve-porting piston and cylinder assembly 82. The air outlet 80c of the valve 80 is connected via the line 188 and the T valve 190 and clamp-feeding line 192 to the tail clamp piston and cylinder assemblies 56, 60, 64 associated respectively with the body form 36 and the body-folding arms 38, 40. Admission of air into the respective clamps 54, 58, 62 clamps the folded tail portion of the shirt S beneath the body form and the respective body-folding arms. Line 188 includes a branch 188a which admits air into the sequencing valve 84 via the air inlet 84a thereof. The sequencing valve 84 is normally opened at the start of the shirt-folding cycle but there is no air connected to the air inlet. The sequencing valve 84 closes as the cylinder 74a pivots into the dotted line displaced position as the tail bar 50 moves through its operative stroke. Upon return of the cylinder 74a to the illustrated position, the reopening of the sequence valve 84 (with air being present in the line 188 and the branch 188a) is effective to supply air via the air outlet 84b and the line 194 to lines 196, 198. The branch line 196 is connected to the lockout piston and cylinder assembly 168 and is effective to actuate the plunger or keeper 168a thereof to lock the control handle 160 against manual operation for reinitiating a shirt-folding cycle after the tail-folding sequence has been completed. The branch 198 is connected to the self-locking pilot-operated valve 200 associated with the first or sleeve-folding piston and cylinder assembly 128, as will be subsequently described.

The valve 80 further includes an air exhaust 80d which is connected via exhaust line 202 to a valve-porting cylinder and piston 204 which is under control of a foot pedal 206 such that the locking chamber of the valve 80 may be ported to atmosphere. Description of the internal details of the valve 80, as well as of the substantially identical valves 162, 164 and other conventional components, is dispensed with herein in the interest of brevity since such valves and components are conventional and details of their operation are patently obvious from an inspection of the drawings.

The valve-porting piston and cylinder 82 is connected via an exhaust line 208 to the air exhaust 162d of the valve 162 for porting the locking chamber of the valve 162 to the atmosphere when the tail-folding bar 50 is in its operative position after completing its tail-folding stroke. The resetting of the valve 162 is effective to connect the pressure side of the cylinder 74a of the tail bar piston and cylinder assembly 74 to exhaust over the line 184 through the valve 162, as is generally understood. Although the valve-operating member 86 returns to the full line position, the valve 80 due to its self-locking construction continues to supply air over line 188 to the sequencing valve 84 and to the several tail clamp piston and cylinder assemblies 56, 60, 64.

The exhaust port 162d of valve 162 is connected to the cycle-aborting valve 164 such that upon rocking movement of the control handle or lever 160 in the appropriate direction and the corresponding depression of the plunger 164a, the valve 162 may be ported to the atmosphere over valve 164 thereby returning the tail-folding bar 50 to the retracted position illustrated in FIGS. 1 and 7. The shirt-folding cycle may be aborted after the tail-folding sequence for the purposes of reinitiating such tail-folding sequence in the event that there is a malfunction in the machine resulting in an incompleted or improperly folded shirt tail.

Line 198 which has air supplied thereto from line 188 over the sequencing valve 84 when the tail-folding sequence is completed is connected via branch 198a and check valve 210 to the valve-actuating port 200a of the valve 200. Branch 198b of line 198 is connected via the one-way check valve 212 to the air inlet 200b of the valve 200, the air outlet 200c thereof being connected via the combination ball check and needle valve 214 to the pressure side of the sleeve arm-actuating piston and cylinder assembly 128.

Actuation of the piston and cylinder assembly 128 rotates the pinion 132 in the clockwise direction about the pivot shaft 42c and is effective to move the cam or projection 132a on the pinion 132 into engagement with the ball actuator of the sequencing valve 216. The position of the projection or cam 132a is such that the sequencing valve 216 is not operated until the piston and cylinder assembly 128 has completed the necessary rotation of the pivot shafts 42c, 44c to move the corresponding sleeve-folding arms to the final or sleeve-folding positions. The sequencing valve 216 has an air inlet 216a which is connected to branch 198c of line 198 and an air outlet 216b which is connected to branch 198c of line 198 and an air outlet 216b which is connected via line 218, branch 218a and combination ball check and needle valve 220 to the pressure side of the actuating piston and cylinder assembly 134 for the body-folding arms 38, 40.

Further, line 218 is connected via branch 218b to the air inlet 190a of the piston-operated T valve 190 such that upon operation of the sequence valve 216, the T valve 190 is effective to block air passage from line 188 to line 192 whereupon the pressure supply to the tail clamping piston and cylinder assemblies 56, 60, 64 is disrupted. The clamp-feeder line 192 is ported to the atmosphere through a needle valve 222 which is adjusted to constantly drain clamp-feeder line 192 to the atmosphere at a slow rate which does not effect the clamping action so long as pressure is derived from line 188. However, needle valve 222 will slowly relieve the clamping pressure upon actuation of the T valve 190 in response to operation of the sequencing valve 216. The rate of pressure decay of the tail-clamping piston and cylinder assemblies may be controlled by adjustment of the needle valve 222.

The admission of air to the pressure side of the cylinder 130 of the body-folding actuating piston and cylinder assembly 130 is effective to drive the rack 130d through its corresponding stroke which brings about rotation of the body-folding arms 38, 40. As the disc 146 rotates in the clockwise direction, the notch 146a on the periphery thereof comes into alignment with the actuating ball 224c of the sequence valve 224 to close the same. Normally the sequence valve has its air inlet 224a ported to the atmosphere through the exhaust port 224b to thereby connect the several elements controlled thereby to atmosphere until such time as the ball 224c enters the notch 146a to close the sequence valve 224. Thereupon, the related piston and cylinder assemblies connected to the lines 226, 228 and 230 are placed into operation under control of regulator 182. Line 226 has a branch 226a which is connected to the pressure-relieving regulator 182. Further, line 226 has a branch 226b which is connnected to the collar clamp-exhaust valve 120 which serves to port the collar clamp-exhaust valve to the atmosphere for restoring the collar-clamping and distending mechanism 52 to the retractated or loading position at the end of the folding cycle.

The branch 226b is connected to the low pressure chamber 182a of the pressure-relieving regulator 182 which is of conventional construction and includes a high pressure chamber 182b, a diaphragm 182c, an air inlet 182d, an air outlet 182f and appropriate internal valving. Pressure equalization in the regulator 182 by introduction of air into the low pressure chamber 182a opens the valve 182 to complete a connection from the air inlet 182d to the air outlet 182f which via line 232 and branches 232a, 232b is connected to the upper ends of the respective cylinders 128a, 130a. The branch 232a includes a combined ball check and needle valve 234 for regulating the flow of air into the cylinder 128a.

Pressure equilization in the cylinder 128a, 130a establishes the same pressure on both sides of the pistons in their respective cylinders. However, the top area of the respective pistons is diminished by an amount corresponding to the cross section of the respective piston rods. Accordingly, there is a pressure differential with a resultant upwardly directed force which will maintain the respective sleeve-folding and body-folding arms in their corresponding folding positions, but with a diminished force which facilitates the removal of the folded shirt from the body form 36. Pressure is built up in line 228, 230 simultaneous with the build up of pressure in line 226. Line 228 is connected to a sleeve arm-backoff piston and cylinder assembly 236 which has the plunger 236a thereof positioned to engage the coupling linkage 136 to drive the same in the reverse direction through a relatively short stroke to further relieve the pressure on the sleeve-folding arm 42, 44. Similarly, line 230 is connected to the body arm-backoff piston and cylinder assembly 238 having its plunger 238a arranged to engage the coupling linkage 150 associated with the body-folding arms for backing off these arms as well. Thus at the completion of the shirt-folding cycle, the respective sleeve-folding and body-folding arms do not bear with the full folding pressure against the body form 36 and the interposed plies of the shirt S, but rather are backed off to a limited degree which is readily controllable by the initial setting set-up of the machine to facilitate removal of the folded package from the body form.

As previously described, pressing the foot pedal 206 operates valve 204 which is effective to bleed the exhaust outlet 80d of valve 80 to the atmosphere. This is also effective to port the pressure side of the cylinder 130a of the body-folding arm actuating piston and cylinder assembly 130 to atmosphere over valve 220, line 218a, line 218, check valve 246, line 198, line 194, line 188a, line 188 and valve 80.

Provision is made for porting the valve 200 which admits air to the pressure side of the folding sleeve-actuating piston and cylinder assembly 128 to atmosphere at the end of the machine cycle. To this end, a valve-exhausting piston and cylinder assembly 240 is provided which is closed throughout the shirt-folding cycle and is opened at the end thereof by the projection 154a on the disc or cam 154. The valve-exhausting assembly 240 is connected via a needle valve 242 and line 244 to the port 200a of the valve 200 which is effective to unlock the valve by bleeding the locking chamber thereof. Restoration of the valve 200 to the illustrated position ports the pressure side of the piston and cylinder assembly 128 to atmosphere over needle valve 214 which restores the sleeve-folding arms to the starting position.

Referring now specifically to FIGS. 1, 7 and 21 there follows a detailed description of the auxiliary or short sleeve-folding arms 46, 48 which are employed to pre-fold the short sleeves of a shirt about the adjacent body-folding arms 38, 40 when the machine 30 is to fold a short sleeve shirt. Since the auxiliary sleeve-folding arms 46, 48 are of identical construction, it will suffice to describe only one detail. The sleeve-folding arm 46 is L-shaped and includes an enlarged blade 46a carrying a wiper brush 46b. The brush 46b and blade 46a are mounted on a resilient arm 46c which is pivoted at 46d on the machine frame in an auxiliary housing 32d which projects forwardly from the wall 34. Normally, the auxiliary sleeve-folding arm 46 is disposed in a stored position within the auxiliary housing 32d wherein such arm does not interfere with the normal mode of operation of the machine when used for the automatic folding of a long sleeve shirt. The auxiliary housing 32d also carries a positioning arm 46e which is secured and projects at an angle thereto. The arm 46e terminates in a catch 46f of a width to accommodate the resilient mounting arm 46c when manually displaced to the position illustrated by the broken lines in FIG. 7 and by the full lines in FIG. 21. A spring 46g is operatively connected between the positioning arm 46c at a point spaced from its pivot 46d to normally bias the auxiliary sleeve-folding arm 46 to the stored or retracted position. At such time as a short sleeve shirt is to be folded by the machine, the shirt is draped over the body form 36 and the auxiliary supports provided by body-folding arms 38, 40 (as shown in FIG. 21) and the auxiliary sleeve-folding arms 46, 48 are swung from their respective retracted positions to beneath the adjacent arms 38, 40, as indicated by the directional arrow in FIG. 21. During such swinging movement, the arms mounting the blade and the brush are flexed into the arcuate configuration illustrated in FIG. 21 such that the corresponding blade and brush will wipe beneath the adjacent body-folding arm from the rearward end thereof (corresponding to the shoulder of the shirt) toward the armpit region of the sleeve until the auxiliary sleeve-folding arm arrives at the illustrated position as established by the catch 46f. In this position, the arm is maintained in a flexed or bowed configuration by the reaction force of the overlying body-folding arm and the short sleeve is folded about the adjacent outer or folding edge of the body-folding arm. At this point, the machine is placed into automatic operation. At such time in the automatic cycle when the body-folding arms swing through their respective folding strokes, downwardly directed forces are imparted to the adjacent and underlying auxiliary sleeve-folding arms which are flexed until the body-folding arms clear whereupon the auxiliary sleeve-folding arms will return to their unflexed condition. This disengages the respective mounting arms from the catch constructions and permits the springs to return the auxiliary sleeve-folding arms to the stored positions until once again manually swung through their operative strokes by the machine operator.

In the handling of long sleeve shirts, it is often advantageous or necessary to make provision for the preliminary orientation of the sleeves of the shirt to assure the proper folding of the sleeves during the automatic machine cycle. In FIGS. 1 to 4 inclusive, there is provided a first form of locating device which orients the sleeves and precludes whipping thereof during the automatic folding cycle and takes the form of a pair of hold-down bars 250, 252 mounted respectively on the side extensions 32c, 32d of the machine frame 32. The hold-down bars 250, 252 are of identical construction. Accordingly it will suffice to describe only the hold-down bar 250 which is seen to be fixed to the adjacent side support 32c at its rearward end is formed with an offset shoulder 250a at a point spaced from the fixed end such as to accommodate a sleeve therebetween. The free end of the hold-down bar 250 terminates in a knob 250b which bears against the adjacent support 32. The knob 250b provides a convenient means for lifting the resilient hold-down bar 250 to facilitate insertion of the shirt sleeve therebeneath. Apart from orienting the sleeve in the proper attitude for folding, it will be appreciated that the hold-down bar 250 enables the operator to drape the shirt sleeve with a certain degree of slack or looseness between the armpit end thereof and the cuff. Accordingly, the adjacent sleeve-folding arm will not immediately engage the sleeve during the sleeve-folding sequence thereby tending to reduce the whip of the sleeve during the folding thereof.

In FIGS. 23 and 24, there is shown a modified guiding and anti-whip arrangement which is particularly suitable for the handling of both conventional barrel cuff and French cuff sleeves. In this embodiment, the side housing 32c is cut away, as indicated at 32f, to define a lateral guideway of a width sufficient to accommodate the normal range of sleeve widths and to guide the same during the sleeve-folding sequence to assure that the sleeve will be properly oriented relative to the adjacent sleeve-folding arm. The so-called barrel cuffs are draped to the position illustrated by the dot-dash lines in FIGS. 23 and 24. Additionally, the cutaway portion or guideway 32f is formed with an upwardly opening sleeve-receiving member 32g of U-shaped cross section which is adapted to receive the cuff of a French cuff shirt, as shown by the full lines in FIGS. 23 and 24. This orients the sleeves of such French cuff shirt in position for the sleeve-folding sequence. In addition it enables the draping of such sleeve with a degree of slack to avoid whipping during the sleeve-folded sequence.

In order to facilitate a more thorough understanding of the present invention, a typical sequence of operations will be described, particular reference being made to the schematic and diagrammatic showing of FIGS. 22A and B.

Although the illustrative automatic shirt-folding cycle will be described in conjunction with a long sleeve shirt, it will be appreciated that the description is equally applicable to the folding of a short sleeve shirt wherein such short sleeves are folded by a preliminary manual operation. At the outset, the shirt S is draped over the substantially coplanar body form 36 and the body-folding arms 38, 40, with the tail portion thereof depending from the aligned leading edges 36a, 38a, 40a and with the sleeves extending respectively between the arms 38, 42 and 40, 44. The cuff portions of the sleeves are either engaged beneath the hold-down bars 250, 252 (as illustrated in the principal embodiment) or beneath the modified guiding and anti-whip assembly (illustrated in FIGS. 23 and 24). A certain degree of slackness is introduced into the draped sleeves by the machine operator in accordance with operational experience. Once the draping is completed with the shirt fronts arranged such that the button and botton hole strips overlie each other, the collar clamping mechanism 52 is engaged by depressing the finger pieces 122e, 122f. This is effective to swing the collar-clamping mechanism 52 and the associated button strip clamp downwardly into the clamping position illustrated in FIG. 16 wherein the collar-clamping jaws 98, 100, 102 are disposed within the neckband of the collar and resilient button strip clamp body 122d engages the superposed fronts of the shirt S. As the collar-clamping mechanism 52 moves into its clamping or depressed position, the elbow 114f of the collar clamp-actuating piston and cylinder assembly 114 engages the air inlet valve 118 to complete an air connection to the pressure side of the cylinder 114a. This is effective to initially spread the collar-clamping jaws 98, 100 into engagement with the opposite sides and back of the neckband, followed by the engagement of the clamping jaw 102 with the neck band symmetrically of the collar button of the shirt. As will be recalled, there are corresponding heater elements 104 in the respective collar-clamping jaws 98, 100, 102 which are effective to internally grip the collar to orient the shirt for folding and to shape-up the collar in a final pressing operation. The pneumatic operation of the collar-clamping jaws enables automatic adjustment to varying neck sizes, with the jaws moving through lesser or greater strokes in accordance with the neck size under the influence of the pneumatic actuating means. At this point in the operation, the shirt is ready for automatic folding which is initiated by manipulation of the control handle 160 in a direction to actuate the valve 162. Operation of the valve 162 (which as previously described is of a conventional construction and is self-locking) is effective to connect supply line pressure available in branch 178b to the pressure side of the tail bar-actuating piston and cylinder assembly 74. Thereupon, the tail-folding bar 50 pivots on the bar shaft 70 through an arc to engage the depending tail portion of the shirt and to fold the same about the aligned leading edges 36a, 38a, 40a with the folded tail portion being received within the open clamps 54, 58, 62 arranged respectively beneath the body form 36 and the body-folding arms 38, 40. When the tail-folding bar 50 arrives at the end of its operative stroke, the valve-operating member 86 is effective to signal the end of the operative stroke in tail-folding sequence and to condition the control for the next operation and to simultaneously restore the tail-folding bar to the retracted position wherein it will not interfere with the subsequent sleeve-folding sequence. Specifically, operation of the valve-porting piston and cylinder assembly 82 is effective to connect the air exhust 162d of the valve 162 to atmosphere which disrupts the air supply to line 184 and ports the line to the atmosphere through the valve 162. Thereupon, the internal spring 74d within the assembly 74 in conjunction with the spring 78 is effective to restore the tail-folding bar to the retracted position illustrated in FIG. 3. At this point in the operation if the tail-folding sequence is not to the operator's satisfaction, it is possible to abort the cycle by operating the control handle 160 in a direction to actuate the cycle abort valve 164 which likewise is effective to port the air exhaust 162d of valve 162 to the atmosphere.

Actuation of valve 80 is effective to supply line pressure from branch 178c through line 188 to the sequence valve 84 via line 188a. However, the next automatic operation is not initiated until the completion of the tail-folding sequence and restoration of the tail-folding bar 50 to the retracted position which is signalled by the cylinder 74 reopening the sequence valve 84. Prior to the return of the tail-folding bar 50 to the retracted or clearance position, pressure in line 188 is communicated over valve 190 to clamp-feeder line 192 and to the pneumatic actuating means 56, 60, and 64 associated with the body form 36 and the body-folding arms 38, 40. This clamps the folded shirt tail there by retaining the same in the folded position notwithstanding the withdrawal of the tail-folding bar 50. When the end of the tail-folding sequence is signalled by the opening of the sequence valve 84 pressure is fed to line 194 which, via branch 196, operates the lock-out cylinder and piston 168. Simultaneously, pressure is applied over line 198 and branch 198a to valve 200 which is operated such that line pressure in branch 198d is fed over check valve 212 through the valve 200 and over the combination ball check and needle valve 214 to the pressure side of the sleeve-folding actuating piston and cylinder assembly 128. Thus, the sleeve-folding sequence is initiated and the respective sleeve-folding arms 42, 44 swing through their operative strokes to fold the draped and positioned sleeves beneath the aligned body form 36 and the body-folding arms 38, 40 as may be appreciated by progressively inspecting FIGS. 2 and 3. The end of the sleeve-folding sequence is signalled when projection 132a on pinion 132 operates sequence valve 216 which has line pressure applied thereto over line 198c. The normally closed sequence valve 216 blocks the passage of supply air into line 218 and branch 218a and to the pressure side of the body-folding piston actuating piston and cylinder assembly 130. However, when sequencing valve 216 is opened at the end of the sleeve-folding sequence supply pressure is applied to the pneumatic actuating means for the body-folding arms 38, 40 which swings such arms through their respective operative strokes, as may be appreciated by progressively inspecting FIGS. 3 and 4. The end of the body-folding sequence is signalled when notch 146a on cam 146 comes into alignment with the ball actuator 224c of the sequencing valve 224. At the end of the body-folding sequence, the shirt is completed folded and is in condition for banding and/or bagging and removal from the body form 36. Throughout the automatic shirt-folding cycle, the sequence valve 224 is opened which ports lines 216, 228 and 232 to atmosphere. When the end of the body-folding sequence is signalled by closing of the valve 224, there is pressure equalization in the low pressure chamber 182a of the pressure-relieving regulator 182 which connects the line pressure available at branch 178e over line 232 and branches 232a, 232b to the upper sides of the respective pneumatic actuating means 128, 130 for the folding arms. This reduces the pressure with which the several folding arms bear against the folded shirt. Simultaneously, pressure is applied to the back-off piston and cylinder assemblies 236, 238 which at this point bear against the adjacent ends of the coupling links 136, 150. This causes the further diminution of the bearing force of the several folding arms against the folding shirt to facilitate removal as previously described. Pressure build-up in line 226 also is effective to operate valve 120 which ports the cylinder 114a of the collar clamp actuating piston and cylinder assembly 114 to atmosphere whereby the collar-clamping mechanism 52 is automatically restored to the retracted or clearance position illustrated in FIG. 1. At this point the folded shirt is removed from the machine.

Upon removal of the folded shirt, it becomes necessary to restore the machine to its initial or starting condition preliminary to the loading and draping of the next shirt. This is accomplished by depressing the foot pedal 206 (see FIG. 1) which is effective via the valve-porting piston and cylinder assembly 204 to port the air exhaust 80d of the self-locking valve 80 to atmosphere which disrupts the connection from the supply line 178c to the line 188. At this point, the pressure side of a piston and cylinder assembly 130 is ported to atmosphere over line 218a, line 218, check valve 246, branch 198c, line 198, line 194, sequence valve 84, branch 188 and line 188 through valve 80. When the piston and cylinder assembly 130 is restored to the illustrated starting position, the projection 154 opens the valve 240 which thereby ports the air exhaust 200a of the valve 200 to atmosphere over needle valve 242. This in turn bleeds valve 200 and connects the pressure side of the sleeve-folding and pneumatic actuating means 128 to atmosphere. The machine now is essentially conditioned for the next sequence of operations.

From the foregoing, it will be appreciated that there has been provided an improved shirt folding machine and method which has a number of practical and significant advantages. The design of the machine is such as to enable the handling of a wide variety of shirt sizes, styles and fabrics, including both long and short sleeve shirts and shirts having barrel and French cuffs. The design of the machine and the folding sequence is such as to assure folding in a manner which prevents a neat and attractive package yet does not unduly mess or crease the folded shirt such that the press will retain and the shirt will be in good condition for use. The essentially pneumatic control includes components i.e. flow restrictors, regulator, piston and cylinder assemblies, etc., which are particularly suited to establish different rates of operations during successive phases or sequences of the machine. This lends itself admirably to establishing an automatic sequence wherein there is no possibility of machine malfunction and damage thereto or to the shirt being folded. Loading of the machine is a particularly easy operation, causes a very low level of operated fatigue, and may be achieved with a relatively low order of skill. The draping operation and engagement of the collar-clamping mechanism is effective to position the shirt for folding and also imparts a final shape and press to the collar which may be varied. The coaction between the several folding elements and the folding sequence is such as to assure the requisite tightness of the plural folds, relatively little entrapment of air to thereby present a compact package, and enables the folding of relatively long sleeve length, particularly those appreciably lengthened by the presence of French cuffs. A controlled clamping action and the establishment of decay rates therefore (with arrangements for automatically backing off the several folding elements at the end of the folding sequence) facilitates easy shirt removal which is further implemented by the automatic release and retraction of the collar-clamping mechanisms at the end of the shirt-folding cycle.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What I claim is:

1. In a shirt-folding machine including a frame, a collar clamp for distending, shaping and clamping the collar of a shirt comprising a manually movable clamp carrier, means mounting said clamp carrier on said frame for movement between a position distant from the collar and a clamping position generally in the plane of the collar, collar-clamping jaws mounted on said clamp carrier for movement from a retracted insertion position relative to each other to an expanded clamping position, and actuating means operatively connected to said collar-clamping jaws for moving said collar-clamping jaws from said retracted insertion position to said expanded clamping position for engagement within the neckband of said collar, said actuating means including means responsive to the movement of said clamp carrier into said clamping position for automatically moving said collar-clamping jaws into said expanded clamping position.

2. In a shirt-folding machine according to claim 1 wherein said actuating means includes sequencing means to first move said second and third collar-clamping jaws into respective expanded clamping positions and then move said first collar-clamping jaw into its expanded clamping position.

3. In a shirt-folding machine according to claim 1, wherein said actuating means includes a pneumatically-operable cylinder and piston assembly pivotally mounted on said frame and pivotally connected to said collar-clamping jaws, a source of air under pressure, and means including a clamp-activating valve operable in response to movement of said clamp carrier into said clamping position for connecting said source to said cylinder and piston assembly of said actuating means.

4. In a shirt-folding machine including a frame, a collar clamp for distending, shaping and clamping the collar of a shirt comprising a manually movable clamp carrier, means mounting said clamp carrier on said frame for movement into and out of a clamping position, collar-clamping jaws mounted on said clamp carrier for movement from a retracted insertion position relative to each other to an expanded clamping position, and actuating means operatively connected to said collar-clamping jaws for moving said collar-clamping jaws from said retracted insertion position to said expanded clamping position for engagement within the neckband of said collar, said actuating means including a pneumatically-operable cylinder and piston assembly including means pivotally mounting said cylinder on said frame and means pivotally connecting said piston to said collar-clamping jaws, a source of air under pressure, means including a clamp-activating valve operable in response to movement of said clamp carrier into said clamping position for connecting said source to said cylinder and piston assembly of said actuating means, means for moving said clamp carrier out of said clamping position including a clamp-exhaust valve connected to said cylinder and piston assembly, and a spring operatively connected to said clamp carrier for biasing said clamp carrier out of said clamping position.

5. In a shirt-folding machine including a frame, a collar clamp for distending, shaping and clamping the collar of a shirt comprising a manually movable clamp carrier, means mounting said clamp carrier on said frame for movement into and out of a clamping position, collar-clamping jaws mounted on said clamp carrier for movement from a retracted insertion position relative to each other to an expanded clamping position, and actuating means operatively connected to said collar-clamping jaws for moving said collar-clamping jaws from said retracted insertion position to said expanded clamping position for engagement within the neckband of said collar, said actuating means including a pneumatically-operable cylinder and piston assembly including means pivotally mounting said cylinder on said frame and means pivotally connecting said piston to said collar-clamping jaws, a source of air under pressure, means including a clamp-activating valve operable in response to movement of said clamp carrier into said clamping position for connecting said source to said cylinder and piston assembly of said actuating means, means for moving said clamp carrier out of said clamping position including a clamp-exhaust valve connected to said cylinder and piston assembly, a spring operatively connected to said clamp carrier for biasing said clamp carrier out of said clamping position, and manually-operable means including a resilient button strip clamp movably mounted on said clamp carrier and manually depressible to move said clamp carrier into said clamping position and to simultaneously move said button strip clamp into engagement with the button strip of the shirt.

References Cited

UNITED STATES PATENTS

| | | | |
|---|---|---|---|
| 2,829,809 | 4/1958 | Freeman | 233—52.1 |
| 2,931,545 | 4/1960 | Renick | 223—52.1 |
| 3,086,686 | 4/1963 | Reswick et al. | 223—52.1 |

MERVIN STEIN, Primary Examiner

G. V. LARKIN, Assistant Examiner